United States Patent [19]

Indeck et al.

[11] Patent Number: 5,546,462
[45] Date of Patent: *Aug. 13, 1996

[54] METHOD AND APPARATUS FOR FINGERPRINTING AND AUTHENTICATING VARIOUS MAGNETIC MEDIA

[75] Inventors: Ronald S. Indeck, Olivette; Marcel W. Muller, St. Louis; George Lawrence Engel, St. Louis; Alan L. Hege, St. Louis, all of Mo.

[73] Assignee: Washington University, St. Louis, Mo.

[*] Notice: The term of this patent shall not extend beyond the expiration date of Pat. No. 5,365,586.

[21] Appl. No.: 303,690

[22] Filed: Sep. 9, 1994

Related U.S. Application Data

[63] Continuation-in-part of Ser. No. 222,693, Apr. 4, 1994, Pat. No. 5,428,683, which is a continuation-in-part of Ser. No. 046,040, Apr. 9, 1993, Pat. No. 5,365,586.

[51] Int. Cl.⁶ .................................................. H04K 1/00
[52] U.S. Cl. ............................... 380/23; 380/3; 380/22; 235/493; 360/2
[58] Field of Search .................................. 380/22, 23, 3, 380/4; 235/493, 449; 360/2

[56] References Cited

U.S. PATENT DOCUMENTS

| | | | |
|---|---|---|---|
| 3,896,266 | 7/1975 | Waterbury | 179/1SB |
| 4,038,596 | 7/1977 | Lee . | |
| 4,806,740 | 2/1989 | Gold et al. | 235/449 |
| 4,882,195 | 11/1989 | Butland | 427/1 |
| 4,906,988 | 3/1990 | Copella . | |
| 4,985,614 | 1/1991 | Pease et al. | 235/440 |
| 5,027,113 | 6/1991 | Bonnaval-Lamothe et al. . | |
| 5,159,182 | 10/1992 | Eisele . | |
| 5,177,344 | 1/1993 | Pease | 235/449 |
| 5,191,613 | 3/1993 | Graziano et al. | 380/25 |
| 5,194,289 | 3/1993 | Butland | 427/1 |
| 5,365,586 | 11/1994 | Indeck et al. | 380/3 |
| 5,428,683 | 6/1995 | Indeck et al. . | |

OTHER PUBLICATIONS

"Smart cards gear up for belated success" by Legg, *EDN*, Oct. 1991, 51–58.

"Smart-card applications' hidden problems add to designers'challenges" by Legg, *EDN*, Mar. 1992, 83–90.

"Noise Correlation of Magnetic Thin Film Media" by Mian, Indeck, and Muller. *Japanese Journal of Applied Physics*, vol. 30, No. 8B, Aug. 1991, pp. L1483–1485.

"Determination of a Track's Edge by Differential Power Spectrum" by Indeck, Mian, and Muller. *Japanese Journal of Applied Physics*, vol. 31 No. 8A, Aug. 1992, pp. L1065–L1067.

"Spatial Noise Phenomena of Longitudinal Magnetic Recording Media" by Hoinville, Indeck, and Muller. *IEE Transactions on Magnetics*, vol. 28, No. 6, Nov. 1992, pp. 3398–3406.

(List continued on next page.)

*Primary Examiner*—David C. Cain
*Attorney, Agent, or Firm*—Howell & Haferkamp, L.C.

[57] ABSTRACT

A method and apparatus is disclosed for determining the remanent noise in a magnetic medium by, for example, DC saturation of a region thereof and measurement of the remaining DC magnetization. A conventional magnetic recording transducer may be used to determine the remanent noise. Upon determination, the remanent noise may then be digitized and recorded on the same magnetic medium to thereby "fingerprint" the magnetic medium. This "fingerprint" may then be later used to verify and authenticate the magnetic medium as being an original. The magnetic medium may be of a type adapted to record information magnetically or, even more broadly, any magnetic surface or substance that can be sensed through its magnetic field. In such manner, any magnetic medium, or any object having an associated magnetic medium, may be "fingerprinted" including credit cards, computer program diskettes, magneto-optic discs, videotapes, cassette tapes, bank checks, stock certificates, etc.

120 Claims, 11 Drawing Sheets

OTHER PUBLICATIONS

"Measurements and Modeling of Noise in DC-Erased Thin-Film Media" by Vos, Tanaka, and Judy, *IEEE Transactions on Magnetics*, vol. 26, No. 5, Sep. 1990, pp. 2149–2151.

"Spatial Structure of Media Noise in Film Disks" by Yarmchuk, *IEEE Transactions on Magnetics*, vol. Mag–22, No. 5, Sep. 1986, pp. 877–882.

"Noise from Unsaturated DC Erasure and Peak Shift of Signals in Longitudinal Thin–film Disk Media" by Ohara, Sato, *IEEE Transactions on Magnetics*, vol. Mag–23, No. 5, Sep. 1987, pp. 2380–2382.

"Novel Applications of Cryptography in Digital Communications" by Omura, *IEEE Communications Magazine*, May 1990, pp. 21–29.

"A Physically Based Approach to Information Theory for Thin Film Magnetic Recording" by O'Sullivan, Porter, Indeck and Muller, *Proceedings of the Thirtieth Allerton Conference on Communication, Control, and Computing*, Oct. 1992.

"Transverse Correlation Length in Thin Film Media" by Mian, Indeck, and Muller, *IEEE Transactions on Magnetics*, vol. 28, No. 5, Sep. 1992, pp. 2733–2735.

"A Magnetoresistive Gradiometer" by Indeck, Judy, and Iwasaki, *IEEE Transactions on Magnetics*, vol. 28, No. 6, pp. 2617–2619.

"An Analysis of Multilayered Thin–Film Magnetic Field Gradiometers Having a Superconducting Spacer" by Indeck, *Journal of The Magnetics Society of Japan*, vol. 13, Supplement, No. S1 (1989).

"Interaction Factors of a Multi–layered Magnetic Thin Film System" by Mian and Indeck, *IEEE Transactions on Magnetics*, vol. 26, No. 5., Sep. 1990.

"An interaction matrix for the energy analysis of an $n$–layered magnetic thin–film system" by Mian and Indeck, *Journal of Magnetism Materials*, 96 (1991), pp. 248–260.

"dc track edge interactions" by Indeck, Reising, Hoinville, and Muller, *Journal of Applied Physics*, 69(8), Apr. 15, 1991, pp. 4721–4723.

"Track edge fluctuations" by Muller and Indeck, *Journal of Applied Physics*, 67(9), May 1, 1990, pp. 4683–4685.

"*In Situ* Measurement of the Remanence Curve of Magenetic Recording Media" by Hoinville, Ornes, Murdock, and Muller, *IEEE Transactions on Magnetics*, vol. 24, No. 6, Nov. 1988, pp. 2976–2978.

"An *in situ* measurement of intergranular coupling in magnetic film media" by Mian, Indeck, and Muller, *Journal of Applied Physics*, 73(4), Feb. 15, 1993, pp. 2027, 2028.

"Noise Characterization of Perpendicular Media" by Indeck, Johnson, Mian, Hoinville, and Muller, *Journal of the Magnetics Society of Japan*, vol. 15 Supplement, No. S2 (1991), pp. 173–178.

"Authentication of Forensic Audio Recordings" by Koenig, *J. Audio Eng. Soc.*, vol. 38, No. 1/2, Jan./Feb. 1990, pp. 3–33.

AUTHENTIC

MAGNETIC FINGERPRINT

CORRELATION WITH MATCH

METHOD AND APPARATUS FOR FINGERPRINTING AND AUTHENTICATING VARIOUS MAGNETIC MEDIA

CROSS REFERENCE TO RELATED APPLICATION

This application is a continuation-in-part of application Ser. No. 08/222,693 filed Apr. 4, 1994, now U.S. Pat. No. 5,428,683 which is a continuation-in-part of application Ser. No. 08/046,040 filed Apr. 9, 1993, now U.S. Pat. No. 5,365,586.

BACKGROUND AND SUMMARY OF THE INVENTION

The sources of noise in a readback signal from a magnetic recording medium have been investigated and identified. One of those sources includes the irregularities and defects in the microstructure of the magnetic medium itself. For many years, the noise generated from this source has been thought, as with the noise generated from other identified sources, to be random and subject only to statistical analysis for its determination. The inventors herein have recently demonstrated that this noise component is instead deterministic, i.e. is permanent and repeatable, depending entirely on the head-medium position and on the magnetic history of the medium. As confirmed by experiments conducted by the inventors herein, when the medium has had no signal written on it and has been exposed only to DC fields, the observed readback signals are almost identical. The magnetic contribution to the readback signal under these conditions results from spatial variations in the medium's magnetization: magnetic domains, ripple, local fluctuations of the anisotropy field and saturation magnetization. These local properties, in turn, are affected by the morphology and magnetic properties of the individual grains which make up the domain and which do not change after deposition. Hence, the noise from a nominally uniformly magnetized region measured at a fixed position on a magnetic medium is reproducible. As shown by the inventors herein, a magnetic medium may be DC saturated and its output then measured to determine its remanent state or remanent noise. The inventors have confirmed that this remanent noise is a function of the magnetic microstructure by comparing the remanent noise after a positive DC saturation with the remanent noise after a negative DC saturation. It has been found that these waveforms are virtual "mirror images" of each other thereby demonstrating a close correlation. Similarly, other methodologies were used to confirm that the remanent noise was deterministic, repeatable, and related to the physical microstructure of the magnetic medium itself. Remanent noise arising from the permanent microstructure exhibits identifiable features characteristic of that permanent microstructure after practically any magnetic history. See *Spatial Noise Phenomena of Longitudinal Magnetic Recording Media* by Hoinville, Indeck and Muller, *IEEE Transactions on Magnetics,* Volume 28, No. 6, November 1992, the disclosure of which is incorporated herein by reference.

There is a long felt need in the art for a method and apparatus to identify or fingerprint various kinds of documents as well as the wide variety of prerecorded magnetic media presently being marketed and/or distributed in the United States and throughout the world. Examples of these magnetic media include those produced and sold in the entertainment industry including magnetic and magneto-optic discs and tapes, cassette tapes, reel to reel tapes, videotapes, etc. Still another major market in magnetic media is the tremendous volume of computer programs routinely sold and/or distributed on floppy diskettes. Magnetic media are also used for other purposes for which it is important to be able to identify and authenticate originals including videotapes, cassette tapes, and other prerecordings on magnetic media of telephone conversations, video recordings of criminal activities, and other such investigative and documentary uses. Still another example of a need in the art for authentication and verification of magnetic media lies in the magnetic data card field. Examples of magnetic data cards include the well known credit card as well as ATM cards, debit cards, security or ID cards, mass transit cards, and even airline tickets or other vouchers which have magnetic stripes thereon for the magnetic recording of data. As well known in the art, virtually every magnetic data card has a magnetic stripe of prerecorded magnetic data which is used to record the customer's account number or some other such identifying data. Tremendous sums of money are lost annually through forgery and other fraudulent copying and use schemes which could be virtually eliminated if an apparatus and methodology could be implemented for reliably authenticating and verifying the identity of a magnetic data card prior to its being approved for its associated transaction. Still other examples extend to paper documents and the like for which there have been some specific efforts of which the inventors herein are aware.

The term "magnetic medium" as used throughout this specification should be understood to refer to any substance, material, surface, or physical embodiment that may be sensed through its magnetic field, whether that magnetic field be intrinsic or induced. As noted above, there are many classic examples of magnetic media which may be thought of in a narrow sense as those surfaces adapted to receive the encoding of information such as data, music and the like with magnetic, analog or digital data. However, there are other examples which are included within the inventors' definition such as magnetic ink applied to a surface through a spraying or lithographing or other process, photocopying processes which utilize an electrostatically applied magnetic toner, the suspension of metal flakes or other magnetizable particles in various fluids such as paint which may be applied to a surface and which then dries to fixate the metal flakes, and even those materials which have no external flux but which when pulsed, for example, generate an externally sensible field. Understanding this definition for the term "magnetic medium", still other physical examples come to mind including any paper documents which have magnetic ink applied thereto such as checks, bank drafts, money orders, and other negotiable or non-negotiable financial instruments such as bonds, stock certificates, etc.

As related in an article entitled *Novel Applications of Cryptography in Digital Communications* by Omura, *IEEE Communications Magazine,* May 1990, a technique is disclosed for creating counterfeit-proof objects. As related therein, the basic idea is to measure some unique "fingerprint" of the paper and to sign (encrypt) it using the secret key of the manufacturer of, for example, a stock certificate. The fingerprint is obtained by moving a narrow intense light beam along a line on the paper and measuring the light intensity that passes through the paper. The light intensity function determined by the unique random pattern of paper fibers along the line then forms the fingerprint of the particular piece of paper. This fingerprint is then digitized and encrypted by the secret encryption function. The encrypted fingerprint is then separately printed onto the paper in digital form such as a bar code. At a later date, the authenticity of the stock certificate may be verified by using a nonsecret public decryption function to decrypt the encrypted data on the paper and reconstruct the intensity function, or fingerprint, that was recorded thereon. Next, the actual intensity function of the stock certificate is measured. If this newly measured intensity function agrees with the intensity function reconstructed from the decrypted data, the document may be declared authentic. This scheme takes advantage of a well know secrecy system referred to as a public key cryptosystem. This system employs a trap door one way function. A user chooses a secret key (the trap door) and after applying the trap door one way function to the data, the procedure determines an algorithm used for decoding which is made publicly known. The trap door one way function is also used to produce the encrypted message. Then every other user can understand the original message by applying the algorithm to the cryptogram. In this system no one else can produce a publicly readable message attributable to the originator's trap door as only the originator has knowledge of that algorithm. This prevents the simplistic forgery attempt of changing the pre-recorded fingerprint to agree with a forged document's fingerprint.

Still another example of an attempt in the prior art to fingerprint or counterfeit-proof objects is shown in U.S. Pat. No. 4,806,740. As shown therein, an object, such as a stock certificate, has deposited thereon a stripe of magnetic medium having a variable density resulting from the non-uniformity of the paper, the process of depositing the magnetic medium on the document, and the dispersion of magnetic particles within the medium. The density variations are randomly created as the magnetic medium is applied, which affords a unique document as these density variations are fixed and repeatable to identify the document. A second magnetic stripe is also applied to the document, but this magnetic stripe is comprised of a medium that is tightly specified and highly controlled in accordance with well known standards in the recording art to be part of a magnetic read/write system. In operation, the non-uniform magnetic stripe is erased, recorded by a standard recording comprised of a linear DC signal or a linear AC signal or a linear bias signal. After recording, another head senses the magnetic characteristic of the recorded magnetic stripe which is translated into a digital, machine readable format, and then separately recorded on the second magnetic stripe in a simple write function. For authentication, the stock certificate is passed under another set of heads which first reads the digitally recorded machine readable representation of the sensed noise signal and then a second set of heads reads the variable density magnetic stripe by first erasing it, recording the same standard noise function, and then sensing the output of the prerecorded noise function as it is "distorted" by the variable density magnetic stripe. If it matches the recorded representation thereof, then the document is declared to be authentic and original. Thus, with the method of the '740 patent, a pair of magnetic stripes must be applied to the document and a specified signal (denominated as noise) must be recorded, measured, and then its output digitally recorded. Furthermore, one of the magnetic stripes must be applied in other than recording industry standard and in a random manner to ensure the randomness of the output thereof. These steps make the '740 patent method difficult and inconvenient to implement.

Yet another example of a prior art attempt to utilize a magnetic medium for authenticating credit cards, documents, and the like is found in Pease et al U.S. Pat. No. 4,985,614 issued on Jun. 15, 1991. This '614 patent is actually quite similar in concept to the '740 patent discussed above in that it focuses on the macroscopic, hereinafter denoted "macro" variations in a magnetic medium, and their effect on an "enhancing" signal recorded thereon in one embodiment or standing alone in a second embodiment. With either embodiment, these "macro" variations are determined by reading a chosen length of approximately 2.6 inches of a magnetic stripe between 3 and 9 times (5 in the preferred embodiment) and then correlating the collected data points to "average out" the effects of head noise, electrical noise, and any other non-medium noise. This correlation results in a "representative profile" which represents the variances which would be induced by these macro effects to a signal if it were recorded on this 2.6 inch portion of magnetic stripe. If these variations are not significant enough to produce a reliable correlation, indicating a lack of significant macroscopic nonuniformities in the medium, the medium is discarded. This is an indication that the medium has been manufactured with too little variation from specification, or otherwise does not have enough macro level variation which might be present due to a manufacturer's watermark or the like, to induce reliably detectable and repeatable variations to a recorded signal. The '614 patent also suggests that macro level noise may be enhanced by locally altering the apparent magnetic characteristics of the stripe such as by placing magnetic symbols on the substrate underlying the magnetic region, or by embossing selected regions of the magnetic material so as to physically move some amount of the material. As the noise levels measured have significant effects on the peaks of a recorded enhancing signal, a simple peak detect and hold circuit is taught as sufficient to collect the data, and a simple "comparison" of the pre-recorded "representative profile" with the presently sensed data points is taught as sufficient to determine if the medium is authentic. Therefore, not only does the '614 patent focus on the use of macro level noise, its device and methodology disclosed for implementing a macro level noise detector is believed to be incapable of reliably creating a microstructure noise level fingerprint and validating its existence at a later time in order to authenticate an original.

In order to solve these and other problems in the prior art, the inventors herein have developed a method and apparatus for utilizing the unique, deterministic, remanent noise characteristic of the magnetic medium itself due to its magnetic microstructure to fingerprint not only documents, but other objects and more importantly, the magnetic medium itself so that it can be identified and authenticated. This inventive technique relies upon the discovery that the microscopic structure of the magnetic medium itself is a permanent random arrangement of microfeatures and therefore deterministic. In other words, once fabricated, the recording medium's physical microstructure remains fixed for all conventional recording processes. In particulate media, the position and orientation of each particle does not change within the binder for any application of magnetic field; in thin film media, the microcrystalline orientations and grain boundaries of the film remain stationary during the record and reproduce processes. It is the magnetization within each of these fixed microfeatures that can be rotated or modified which forms the basis of the magnetic recording process. If a region of a magnetic medium is saturated in one direction by a large applied field, the remanent magnetization depends strongly on the microstructure of the medium. This remanent state is deterministic for any point on the recording surface. Each particle or grain in the medium is hundreds to thousands of Angstroms in dimension. Due to their small size, a small region of the magnetic surface will contain a very large number of these physical entities. While the fabrication process normally includes efforts to align these particles, there is always some dispersion of individual orientations and positions. The actual deviations will be unique to a region of the medium's surface making this orientation a signature or a "fingerprint" of that medium. To reproduce this distribution, intentionally or not, is practically impossible since this would entail a precise manipulation of the orientation of numerous particles at the submicrometer level. Thus, the orientation of a large set of particles on a specific portion of a recording surface can uniquely identify that medium. In experiments, the inventors have found that the remanent noise from a length of between about 30 micrometers and 4300 micrometers provides enough data to "fingerprint" a magnetic medium. This may be contrasted with the 66,040 micrometers (2.6 inches) of length required in the '614 patent in order to fingerprint a magnetic medium with macro noise.

In essence, the present invention is elegantly simple and adapted for implementation by conventional recording heads as are commonly found and used in virtually every read or read/write device presently utilized by the public at large. Such examples include credit card readers, magneto-optic disc players, cassette players, VCRs and personal computers. Furthermore, a card reader may be coupled with virtually any device or process, and the card reader used as a "gatekeeper" to permit input or access only by those who can present a valid passcard for authentication. Because of the relatively small amount of "magnetic medium" which is required to achieve an accurate fingerprinting, the application of the present invention extends well beyond magnetic recording surfaces as discussed above. For example, the magnetic numbers applied to bank checks have sufficient length to provide for accurate "fingerprinting" of each individual check.

In its simplest implementation, a conventional recording head need merely DC saturate a specified portion of a magnetic medium, and then "read" or "play back" the remanent noise which remains. For convenience, the fingerprint may be obtained from the region between two recorded magnetic transitions already in place on the medium. This remanent noise, which is an analog signal, may then be digitized and recorded, in the medium itself or elsewhere, in machine readable format perhaps using a trap door function. Thus, the magnetic medium has become "labeled" with its fingerprint. Verification or authentication of that magnetic medium is simply achieved by reversing this process except that in the more security sensitive applications the digitally recorded fingerprint must be decrypted using the publicly known key. Should the measured remanent noise match the remanent noise as recorded, the magnetic medium is authenticated.

There are many variations in utilization of the inventors' method and apparatus which expand its universe of applications. For example, some applications need not require the use of a trap door function such as, for example, when the encoded objects are not publicly distributed and instead are being identified solely for the user's purposes. One such example would be for use with inventory items. Other examples include those applications of magnetic media which are not adapted for the recording of data or information thereon. For example, a bank check includes magnetic numbers along its lower edge which are used to process the bank check at various stages in the check clearing system of the financial world. At any one or more selected points in that system, a fingerprint may be used to verify that the check is valid and is not a forgery. In this application, the bank check may be fingerprinted by the issuing institution as bank checks are given to account holders for their use. This would eliminate the widespread counterfeiting of bank checks using either accurate or inaccurate account holder information imprinted on the check. In this way, commercial banking institutions can ensure that only their imprinted and authorized checks are used by their account holders and are honored through the check clearing system. This application of the inventors' fingerprinting process would eliminate significant amounts of fraud in the commercial banking system.

Utilizing the present fingerprinting invention with other financial instruments would eliminate many other kinds of fraud, forgery and the like with minimal interruption or modification to presently used documentation paradigms through imprinting of account numbers, certificate numbers, and other identifying indicia or data and the reading thereof as these financial instruments are processed. Stock certificates, bond certificates, bearer bonds, bond coupons, treasury bills, and other financial instruments could be fingerprinted to eliminate their forgery. Reading and verification of the fingerprint is easily achieved at the same time that the magnetic certificate number, account number, ID number, or other numbers on the instrument are read as the instrument is processed through various points in its processing through the financial markets. By utilizing the particular numbering already implemented, and readers already implemented, this increased level of protection for authenticity can be achieved with minimal change in the processing machinery. As such, the inventors' apparatus and method are uniquely suited to adaptation in this particular application.

Still another application involves the "copy protection" of mass distributed application software. Over the years, many schemes have been tried and almost uniformly abandoned for copy protecting publicly distributed diskettes of prerecorded software. This has happened for many reasons including the problem that almost all of the copy protection schemes previously implemented interfere with the running of the software on the user's computer. With the present invention, a copy protection scheme may be implemented which does not interfere with the running of the software and instead merely provides a precondition to running of what is otherwise normally written code. In its implementation, a software diskette may first instruct the computer in which it is inserted to read a fingerprint of a specified portion of the diskette and compare it with a prerecorded version of the same fingerprint. If the fingerprints match, then the software may permit the computer to further read and implement the application software stored thereon. However, if the fingerprint detected by the computer does not match that which is stored in the software, then the software itself may inhibit further reading of the program and prevent its implementation. This would absolutely prevent a user from making a copy of a program for use by someone else. This scheme may also be slightly modified as discussed in the detailed description of the preferred embodiment to permit a user to make a single archive or backup copy such that the fingerprint comparison permits the first non-matching fingerprint copy to be run but then prevents any other non-matching fingerprinted copies to run. This implementation is easily achieved and "copy protects" application software reliably, inexpensively, and requires only minor hardware changes to the massive number of computers already in consumers' hands.

Still another significant application of the present invention involves authenticating credit cards using the single magnetic stripe already implemented on most major credit cards. Again, this may be contrasted with the '614 patent which suggests that a second stripe be added because of the required 2.6 inches of stripe length which must be dedicated to the macro fingerprint techniques. The same method would be used as explained above to measure and record the "fingerprint" of the particular magnetic stripe contained on a particular credit card and then a credit card reader would require that same fingerprint to be matched every time it is used to verify its authenticity. While there are already a large number of credit cards in circulation, these cards are routinely subject to expiration such that there is a continual replacement of these cards in the public's hands. Thus, over time the installed base of credit cards could be readily transformed to those which have been "fingerprinted". Furthermore, an existing card base maybe "fingerprinted" as used to more rapidly implement the "fingerprint" system. This could be done at the next use of each card by each cardholder.

In a variation to this application, the present invention may be coupled with a data base or processor, such as in so-called Smart Cards. These credit card-like devices actually contain, in addition to perhaps the standard credit card magnetic stripe, an on-board electronic memory and/or microprocessor. This memory or microprocessor may contain all sorts of information including money substitute data. For example, at present a large number of these smart cards are in use in Europe as pre-paid telephone cards which are pre-loaded with a monetary amount which is charged against by a pay phone. The cards are used until their pre-loaded monetary equivalent has been depleted and then they are discarded. While various security methodologies have been developed to protect against fraud, these are subject to breach. The present invention is uniquely suited as a security scheme for smart cards as it depends solely on the magnetic microstructure of the particular magnetic medium. In use, the magnetic fingerprint could be stored on the magnetic stripe, in the smart card memory (on board the card), or in a central computer. When coupled with a trap door function, no fraudulent card could be created without access to the trap door function and every transaction could be quickly pre-authorized at a local card reader, without phoning a central clearing authority. In an extension to all credit card applications, the fingerprint data may be stored along with each transaction so that a complete record or trail is created which traces a particular card's history. Thus, the present commonly used scheme where a number of fraudulent cards are created with a correct but stolen account number could either be thwarted or effectively prosecuted.

Another level of security incorporates random placement of the fingerprint position. This might be a function of the card's number. For example, the card number modulo "P" might point the read electronics to a particular data bit around which the fingerprint will be found.

Still another significant category of applications involves utilizing the present invention in its gatekeeper function. Any system, process, machine, location, or other function to which access is desired to be restricted to only those who are authorized, the present invention provides a unique and reliable solution. In its simplest implementation, a passcard may be created with a magnetic stripe which is fingerprinted in accordance with the present invention. Although examples will be discussed in terms of utilizing a passcard, it should be understood that any magnetic medium can be similarly used in accordance with the teachings herein. As such, all other such examples and implementations are intended to be included within the present invention and shall be understood to be included within the term "passcard". This passcard may then become a personal ID card which may be used not only to control access, but also identify the particular person accessing the service, function, etc. by storing the particular magnetic fingerprint of the card being used. Numerous examples may be readily considered. For example, access to a computer network through a remote terminal may be controlled utilizing a passcard of the present invention. This would be implemented through the use of a diskette which may be readily inserted in any floppy disk drive which could authenticate the fingerprint on the diskette. Alternatively, an inexpensive card reader, adapted to read a passcard, could be utilized as well. Many other applications would utilize the modified card reader. For example, a bank teller may be assigned a passcard which could then be used to track all of the transactions entered by the teller and thereby more reliably guard against teller fraud. The myriad of identification cards utilized by businesses, health plans, universities, hospitals, and other organizations or facilities could readily adopt and use a passcard to more securely identify and preauthorize the users of its services, facilities, etc. Not only would existing uses be readily amenable to replacement with the passcard of the present invention, but other new services and systems could be implemented because of the high degree of security provided by the present invention. This may include home shopping and pay-per-view video. This may well lead to the creation of national data bases, national ID cards, and other more universal implementations of credit cards or passcards. This is especially true if a system utilizes not only the magnetic fingerprint of a particular passcard, but also utilizes a secondary security check such as a picture ID, human fingerprint, hologram (presently imprinted on credit cards), or other such methodology which would thereby render the passcard system virtually impregnable. With such security, individuals may be more willing to turn over such detailed personal financial and health information as would make these systems feasible.

While the principal advantages and features of the invention have been described above, and a number of examples given, a greater understanding of the invention may be attained by referring to the drawings and the description of the preferred embodiment which follow.

DETAILED DESCRIPTION OF THE PREFERRED EMBODIMENT

Figure 1:
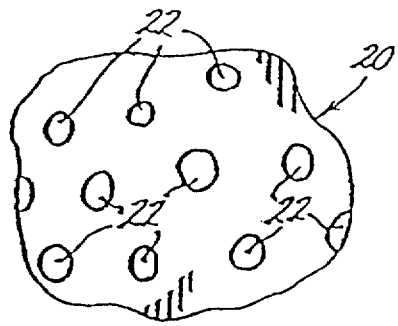
FIG. 1 is a magnified representative depiction of the microscopic structure of a region of magnetic medium.
Figure 2:
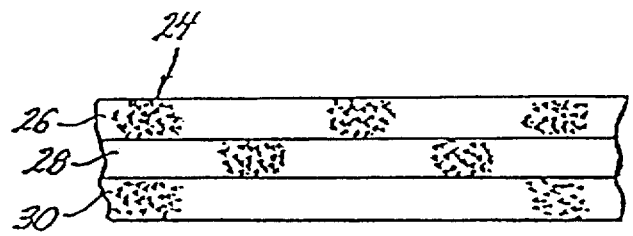
FIG. 2 is a magnified depiction of several tracks of a magnetic medium having microscopic structure representatively shown thereon.

As shown in FIG. 1, a region of magnetic medium 20 is built up with a plurality of microcrystalline structures 22 in a random pattern. This microcrystalline structure 22 is comprised of particles or grains varying from hundreds to thousands of Angstroms in diameter. The view of FIG. 1 is greatly enlarged and magnified in order to depict this physical microstructure. As shown in FIG. 2, this microcrystalline structure extends throughout the magnetic medium even though the magnetic medium 24 shown in FIG. 2 may be itself comprised of tracks 26, 28, 30 as well known in the art. Although shown schematically as separate regions, the fingerprint can be obtained from any portion of the medium 24.

Figure 3:
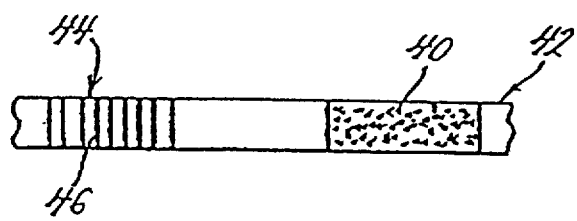
FIG. 3 is a partial view of a track of magnetic media having its fingerprint recorded thereon in machine readable code.
Figure 4:
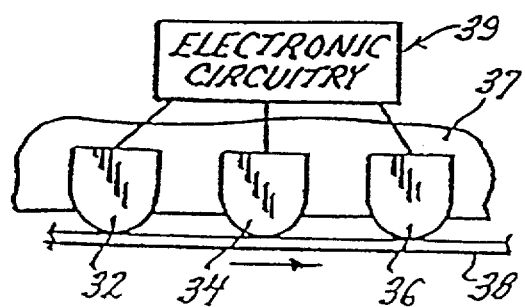
FIG. 4 depicts three conventional recording heads and a magnetic medium traveling thereunder.

Referring now to FIGS. 3 and 4, a plurality of conventional recording heads 32, 34, 36 are shown mounted in a head transport 37 with a traveling magnetic medium 38 controllably driven past recording heads 32, 34, 36 all as is well known in the art. These recording heads 32–36 may be any magnetic transducer or magneto-optic transducer head, as known in the art. Recording heads 32–36 are all connected to electronic circuitry 39, as well known in the art, to control and read their input and output and to further process signals for playback or other use. Although only three heads 32, 34, 36 are being shown in FIG. 4, it will be well understood to those of ordinary skill in the art that a plurality of recording heads of any number may just as easily be provided and, as taught herein, may be required in order to effect the purposes of the present invention. The inventors have constructed a prototype which demonstrates the operability of the invention using a single head. As shown in FIG. 3, the magnetic "fingerprint" at a specified region 40 of a thin film magnetic medium or tape 42, shown representationally in FIG. 3 as a thin film tape, may be recorded at a second position 44 on said thin film magnetic medium or tape 42 in a digitized, machine readable code 46 or the like.

As their preferred embodiment, the inventors have utilized a methodology for reading or determining the remanent microstructural noise characteristic of the region 40 of the magnetic medium which is being "fingerprinted". Preferably, this region 40 is on the order of several tens to hundreds of micrometers. This region is then DC saturated and then subjected to a "read" step for determining the remanent noise produced thereby.

While this is the preferred embodiment, it should be understood that the fingerprint is always there, whether the medium has been recorded over or not. Therefore, it is not strictly necessary that the specified portion of medium containing the fingerprint be DC saturated, or DC saturated in the same polarity in order to obtain the fingerprint. Instead, it is only important that the remanent noise be determined in a manner which facilitates its being correlated successfully with the earlier determined remanent noise. Furthermore, it is to be understood that the phrase "magnetic medium" is much broader than just a magnetic surface which is used to record analog data or magnetic "ones" and "zeros". The phrase "magnetic medium" includes any magnetic surface or substance that can be sensed through its magnetic field.

If this information is obtained in a "single shot" measurement, then the results will include both electronics noise as well as the remanent noise attributable to the particles' orientation. As this "noise" or "remanent noise" is electronically determined as an analog signal, this information may then be digitized and recorded with between about tens to hundreds of digital bits of information as may be representationally shown as code 46 in FIG. 3. In experiments, the inventors have made multiple measurements and averaged their results in order to eliminate the electronics noise present in the measured waveform. However, there was observed a high correlation coefficient when the two sets of data, i.e. single shot and averaged, were compared thereby demonstrating that a single shot reading could readily be used in comparison to an averaged set of data in commercial application. The normalized cross correlation coefficient r is used where $$r = \frac{\sum_{i=1}^{N}(x_i - \bar{x})(y_i - \bar{y})}{\sqrt{\sum_{i=1}^{N}(x_i - \bar{x})^2 \sum_{i=1}^{N}(y_i - \bar{y})^2}}$$

as explained by the inventors in their earlier published article mentioned above.

In order to recover or measure the "fingerprint" or remanent noise, the process is similarly repeated and, when comparing two single shot waveforms, a smaller correlation therebetween was experienced. However, the correlation experienced with two single shot waveforms was significant and clearly demonstrated this method's feasibility for commercial application as well.

Figure 22:
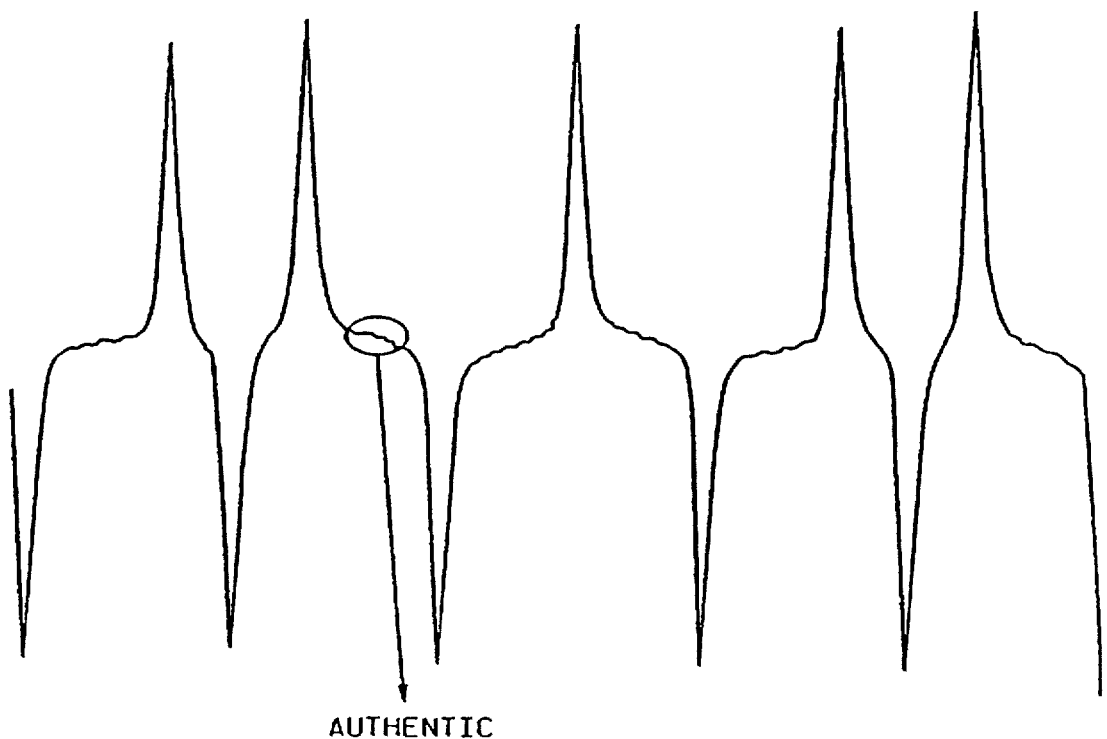
Figure 23:
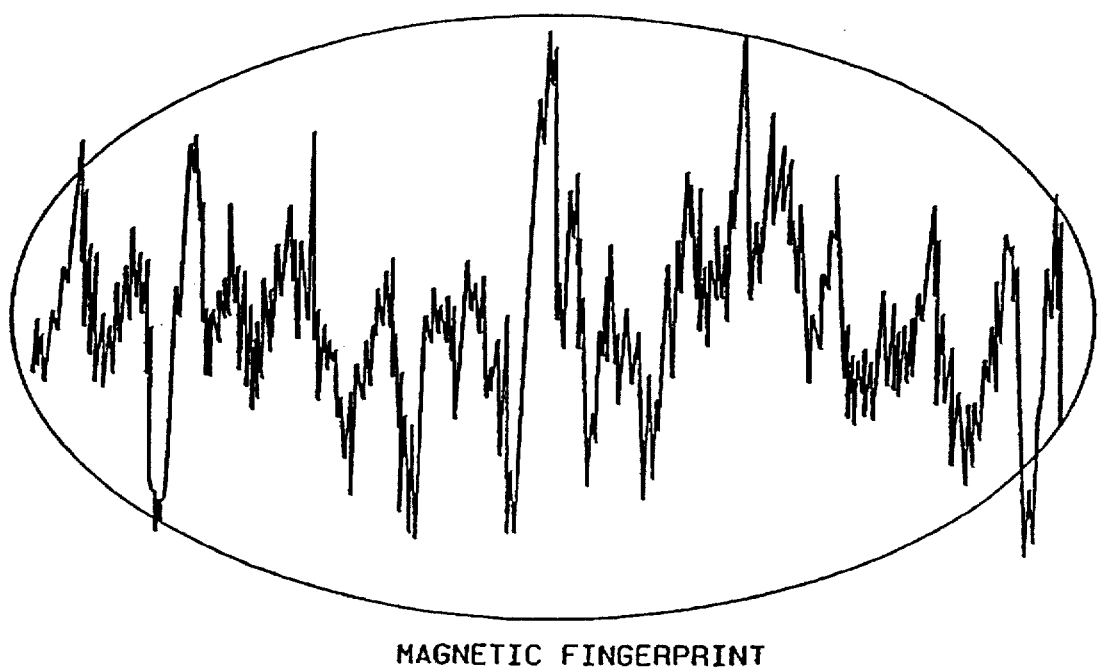
Figure 24:
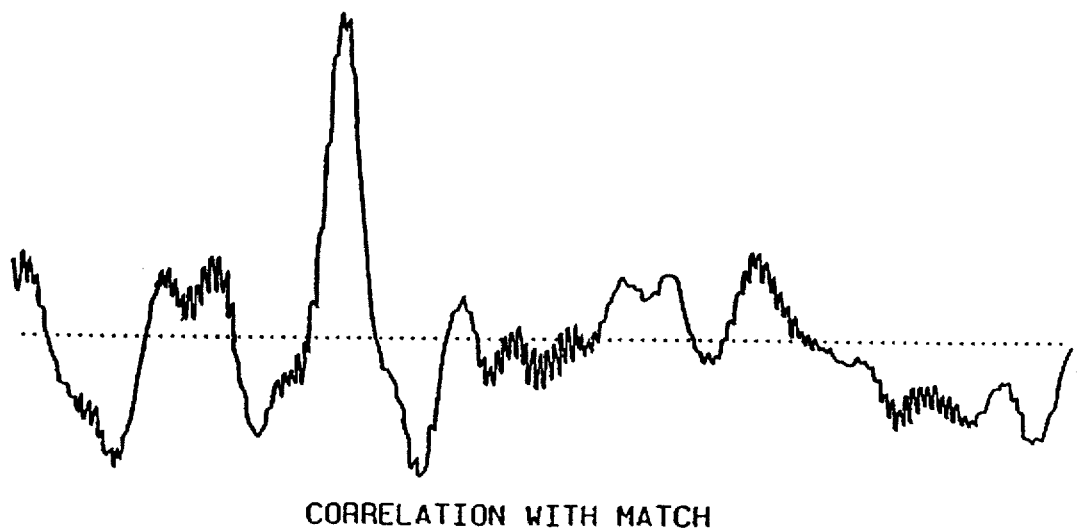

As shown in FIG. 22, the portion of the signal used for fingerprinting is very small with respect to the rest of the recorded signal. As shown in FIG. 23, the encircled portion or fingerprint from FIG. 22 may be amplified to show in greater detail the waveform. In FIG. 24, a correlation using the present invention produces a definable "peak" which verifies the existence of the fingerprint in the medium.

Figure 5:
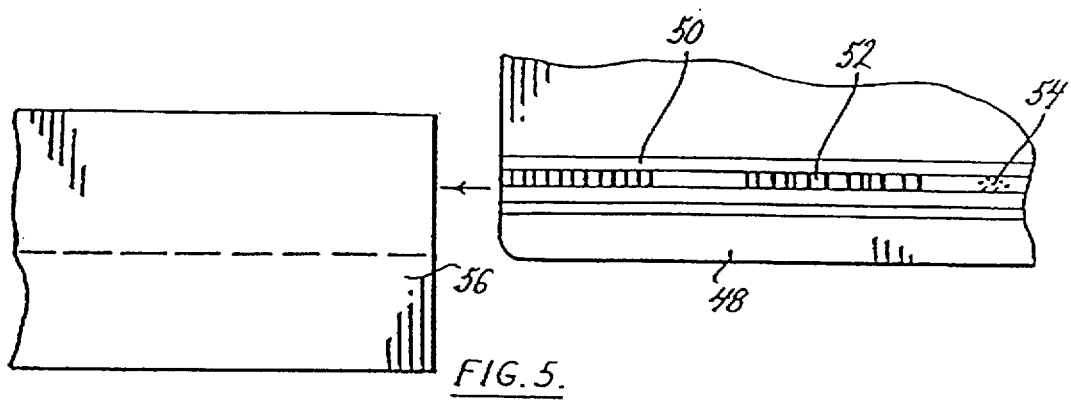
FIG. 5 is a view of a credit card having fingerprint data encoded thereon for reading by a credit card reader.

As shown in FIG. 5, a practical implementation for the subject invention includes a magnetic data card 48 which has a magnetic stripe 50 thereon with magnetic stripe 50 being encoded with a code 52 representative of a fingerprint of a region 54 of magnetic stripe 50. Thus, as the magnetic data card 48 is "swiped" through a card reader 56, the card reader 56 may read the code 52 and translate it to determine the stored fingerprint data, read the fingerprint at region 54 of the magnetic stripe 50, compare them for a match, and if they match then authenticate magnetic data card 48 as a genuine card which has not been altered and which may be approved. Alternatively, the fingerprint need not be stored on the card but may instead be stored centrally, as in a data base elsewhere.

Figure 10:
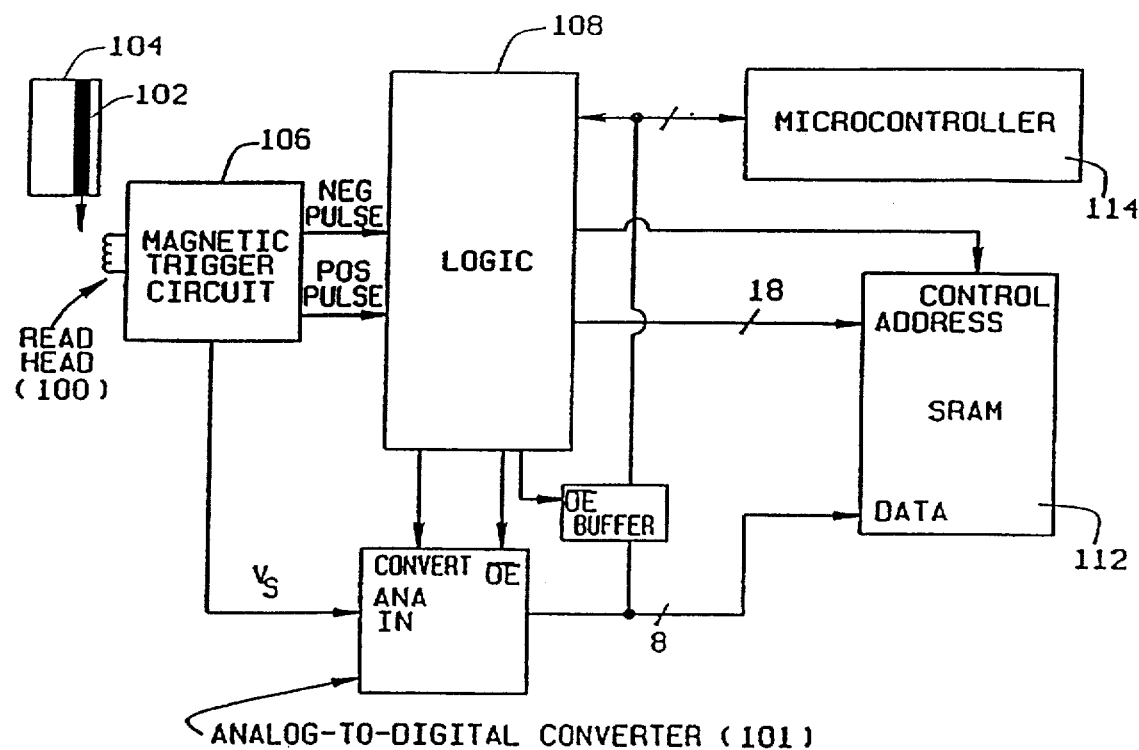
FIG. 10 is a block diagram of a magnetic fingerprint verification circuit.
Figure 11:
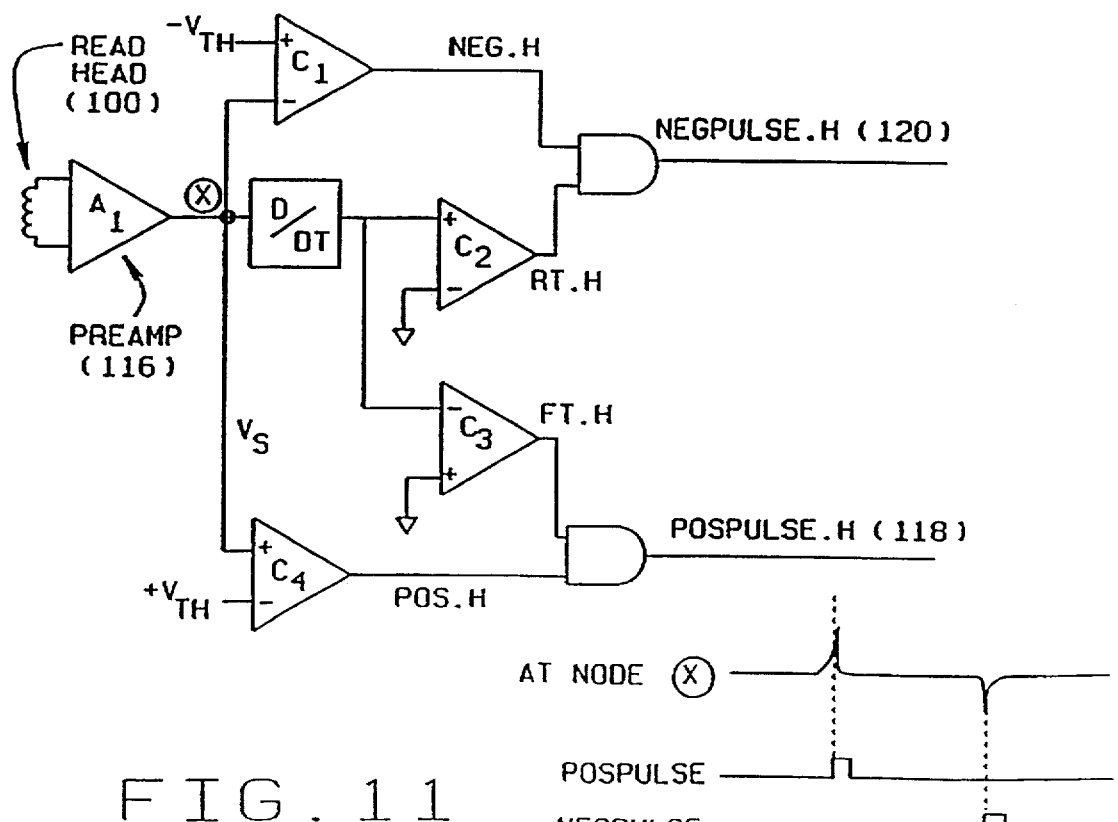
FIG. 11 is a block diagram of the magnetic trigger circuit shown in FIG. 10.
Figure 12:
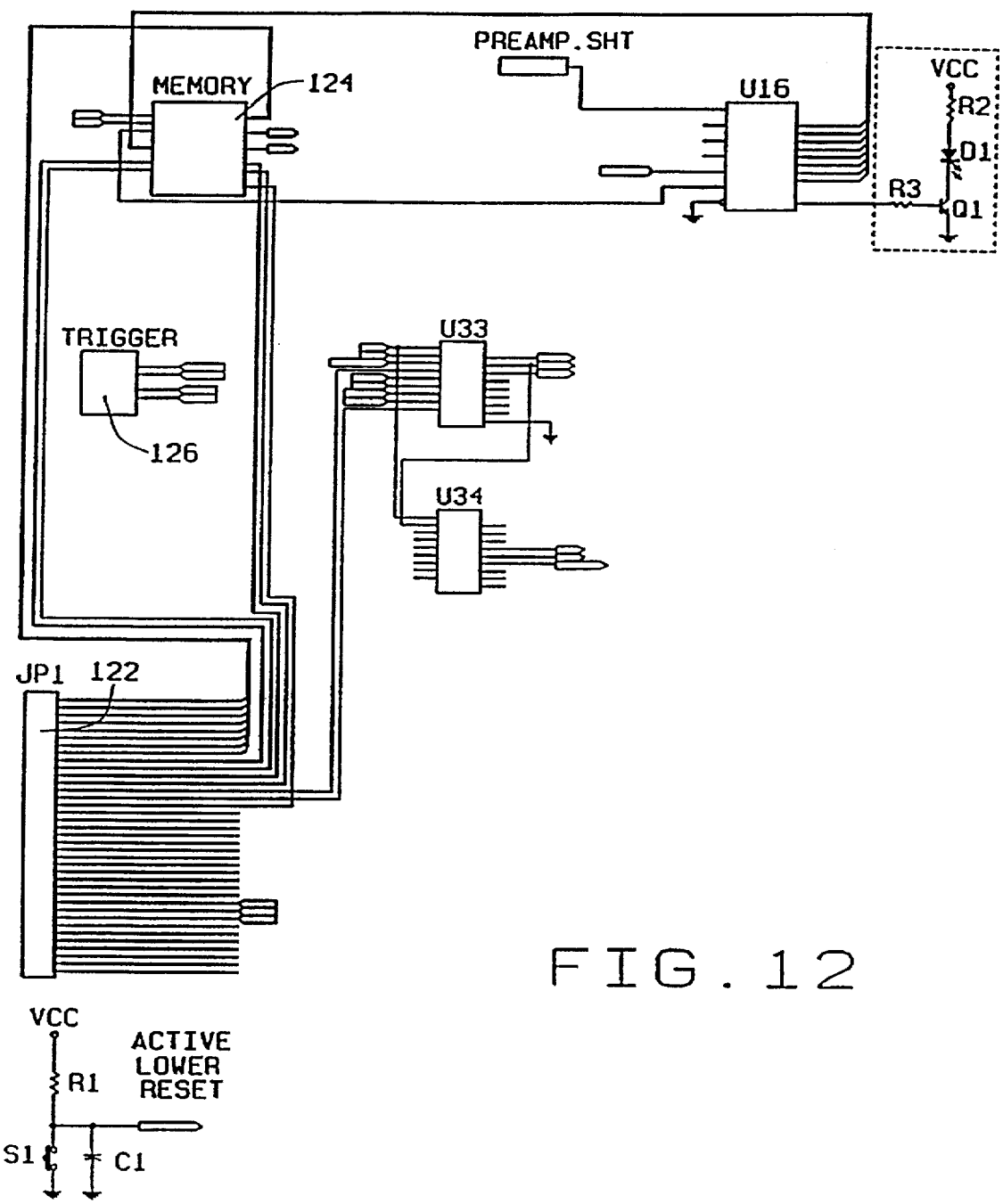
FIG. 12 is a schematic diagram of an implementation of the present invention utilizing a personal computer.
Figure 13:
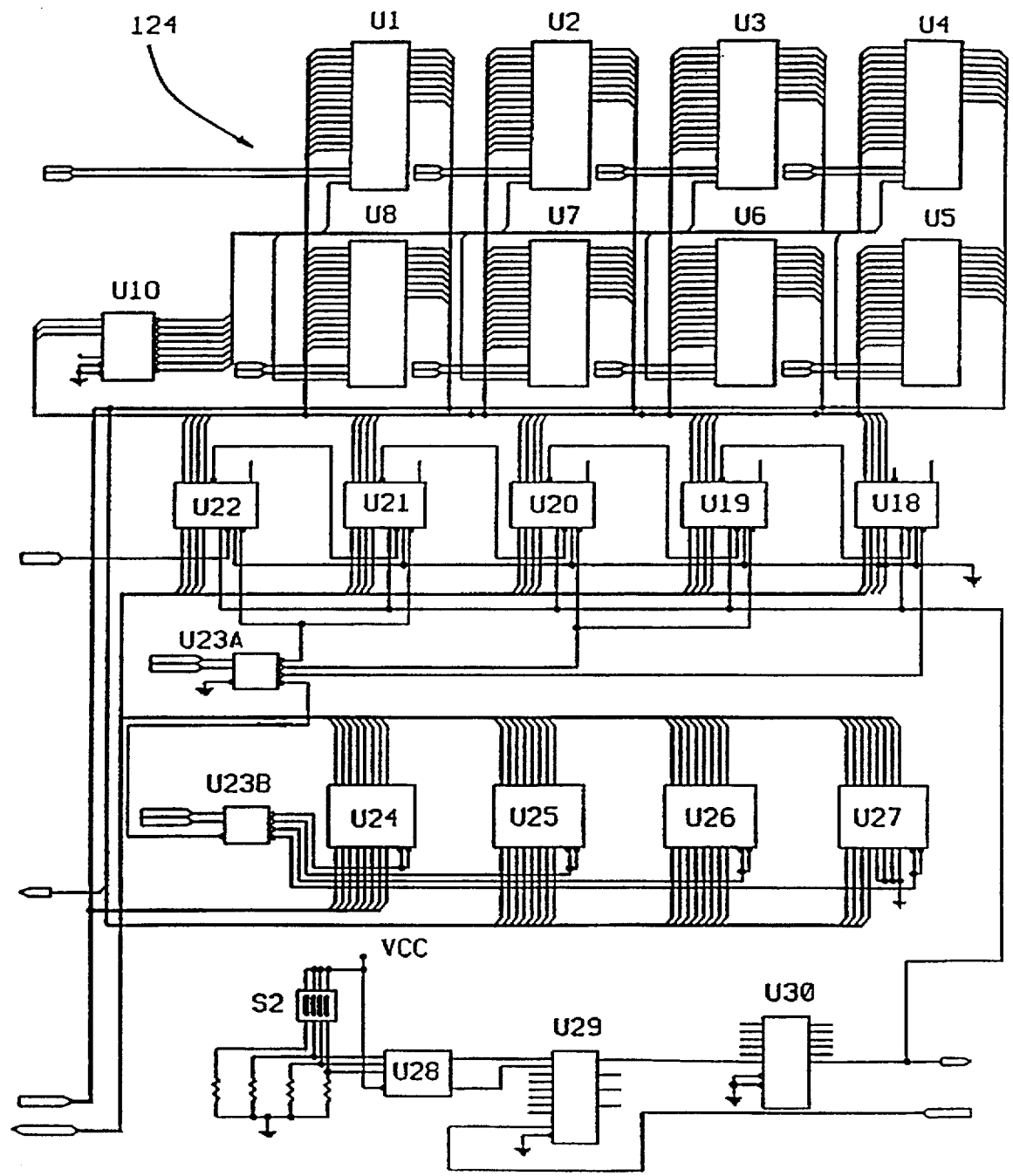
FIG. 13 is a schematic diagram of the memory utilized in the implementation of FIG. 12.
Figure 14:
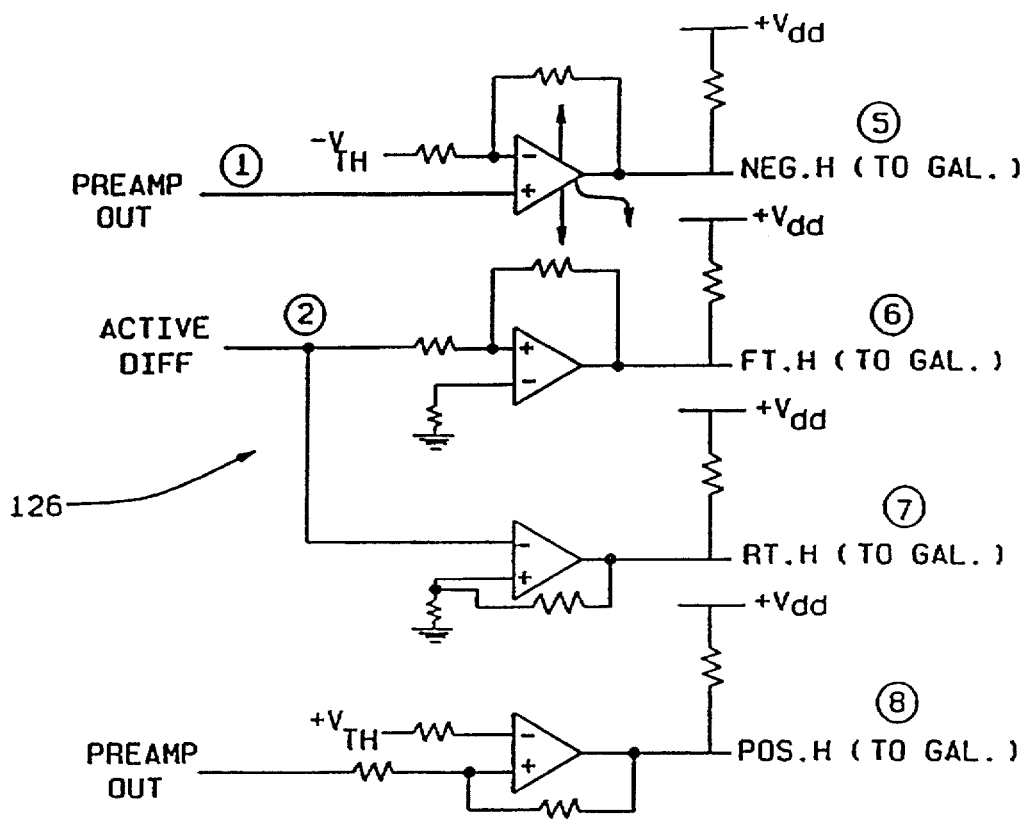
FIG. 14 is a schematic diagram of the trigger circuits utilized in the implementation of FIG. 12.
Figure 15:
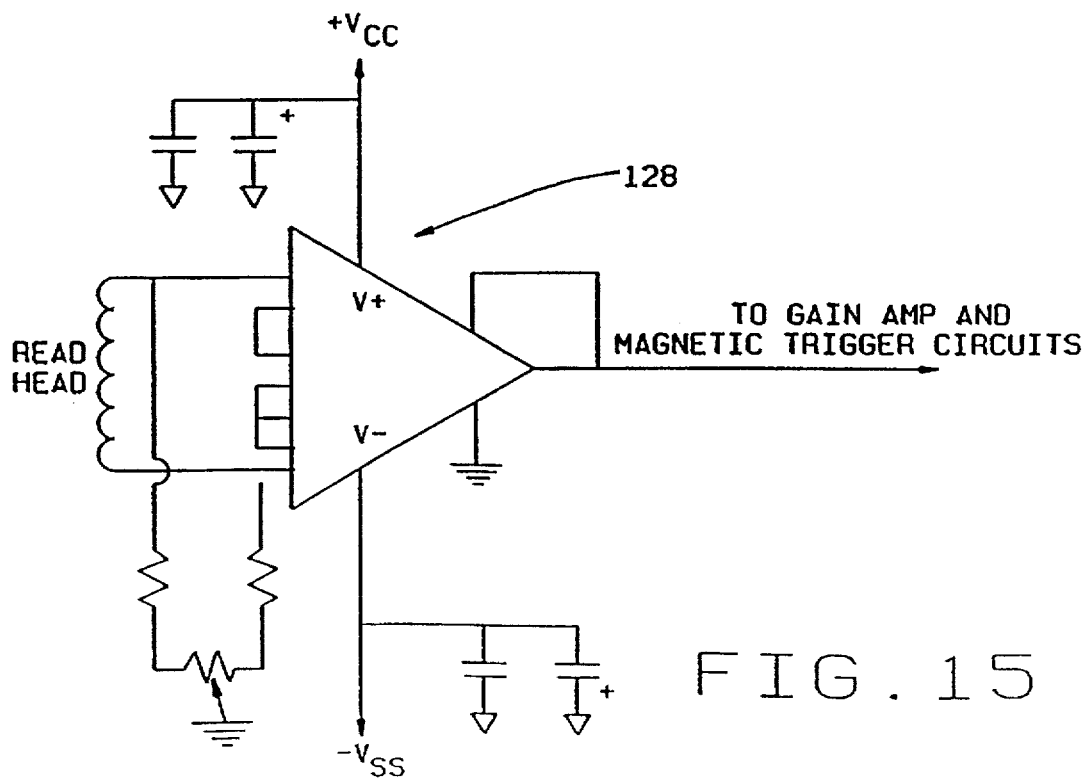
FIG. 15 is a schematic diagram of the preamp circuits utilized in the implementation of FIG. 12.
Figure 16:
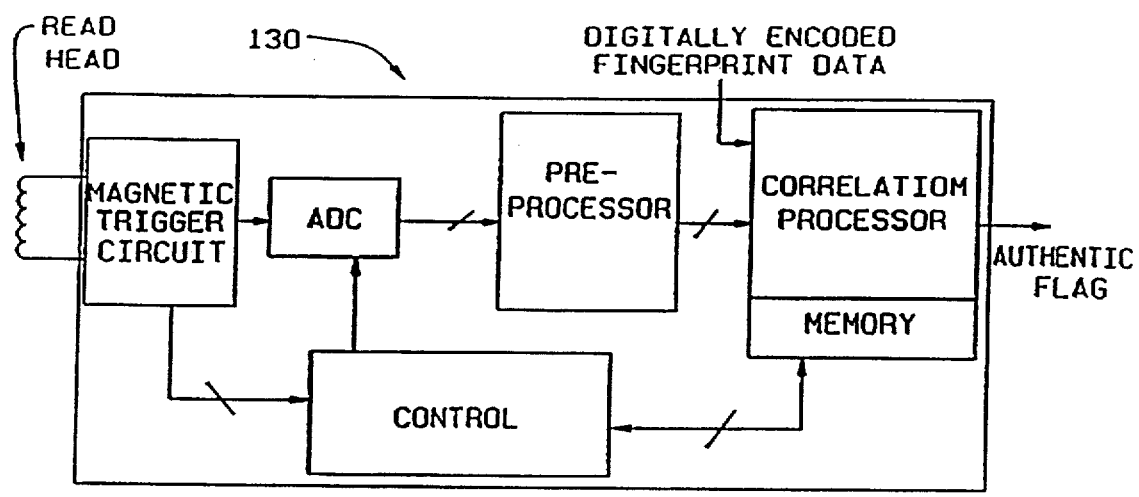
FIG. 16 is a block diagram of a magnetic fingerprint verification circuit set up for implementation in an integrated circuit.

As shown in FIG. 10, a schematic block diagram for a magnetic fingerprint authenticating device includes a read head 100 for reading the magnetic medium 102 which may be on a credit card or passcard 104 as previously described. A magnetic trigger circuit 106 (including the gain circuit shown in FIG. 21) pulses on a logic element which enables memory 112 to store the stream of digital data from read head, $V_s$, produced by an analog to digital converter 110 (including a reference voltage generator shown in FIG. 20). A microcontroller 114 then processes the data and compares it with the original fingerprint in order to authenticate the credit card or passcard 104. The magnetic trigger circuit 106 is shown in greater detail in FIG. 11. It includes a preamp 116 (shown in greater detail in FIG. 15) which amplifies the output from read head 100 to produce, through a set of analog comparators (see FIG. 14) with thresholds produced by threshold generators (see FIG. 19), a positive pulse output 118 and a negative pulse output 120, as shown by the timing graph in the lower half of FIG. 11. The logic 108 may be implemented as shown in FIG. 12 by connection to a PC through connector 122. A memory element 124 is shown in greater detail in FIG. 13, trigger circuits 126 are more completely shown in FIG. 14, and preamp circuits 128 are shown in FIG. 15. A block diagram 130 for a magnetic fingerprint device is shown in FIG. 16 which is arranged for implementation in a custom integrated circuit.

In many of the implementations of the present invention, the speed at which the magnetic medium is propelled past a recording head, card reader, or the like is fixed both when the magnetic fingerprint is first measured and, later, when the magnetic fingerprint is read in order to verify or authenticate its validity. Some examples of this fixed reading speed include the speed at which a floppy disk is rotated in a computer, the speed at which a VCR tape is played, the speed at which an audio cassette tape is played, the motorized reading of an ATM card, the processing of bank checks by automated devices, etc. This is even true for certain credit card applications where motorized card readers could be implemented. However, there are also other applications for which a controlled speed cannot be expected. Perhaps the most prevalent situation known today is the widely used credit card readers which require a retail clerk to "swipe" the card through a reading track. For those situations wherein the speed of the magnetic medium is variable, or different from when the fingerprint was first determined, the inventors have developed a number of methodologies to ensure that data corresponding to the magnetic fingerprint are captured and used in the verification process. This helps eliminate improper rejections of valid credit cards, passcards, and the like. For clarity, these various methodologies will now be explained with respect to a credit card having a magnetic stripe. However, it should be understood that these methodologies are equally applicable to any application wherein the speed Of the magnetic medium is variable or potentially variable from that of the original fingerprinting step.

With the magnetic fingerprint authenticating device whose block diagram is shown in FIG. 10, a series of data points, perhaps 150, are taken between the two trigger pulses recorded in the magnetic medium. As shown with the magnetic trigger circuit of FIG. 11, the signal "POS PULSE" becomes active when the "center" of a sufficiently large positive going pulse is detected. Similarly, the signal "NEG PULSE" is active when a sufficiently large negative going pulse is detected. The derivative of the incoming signal is taken using an active differentiator (shown in greater detail in FIG. 18) in order to locate the center of the pulse. By locating the center of the pulse, the distance between the center of the pulses which define the fingerprint area is thus fixed and represents a distance which is reliably ascertainable every time the credit card is swiped through a credit card reader. A level sensitive detection is also performed but this is only to help guard against false trigger events. The A to D converter samples at a fixed rate such as $F_{s1}$. Thus, the spacing between samples is delta $x_1$ where delta $x_1$ is equal to $V_1$ (velocity of the credit card) divided by $F_{s1}$ (the sampling rate). If the sampling frequency $F_{s1}$ is a few hundred kHz, then delta $x_1$ is on the order of one micron. The number of samples taken, P (perhaps 150), is counted and may be recorded on the credit card along with the fingerprint. In order to improve the reliability, several readings of the magnetic fingerprint may be made and then averaged in order to eliminate the effects of head noise, electronic circuit noise, and any other noise other than the magnetic microstructure noise of the magnetic medium. This completes the process of determining the fingerprint for a credit card.

When the card is in use, and its fingerprint is desired to be authenticated, it is necessary to sample the same region of the magnetic medium of the card which was sampled at the time of its fingerprinting. Furthermore, the distance between sample points must be the same as it was when the card was fingerprinted and, in our example, this distance is delta $x_1$. Although it is desired for this to be exactly the same, the inventors have found that some variance, up to a few percent, may be acceptable. The sampling interval is determined both by the sampling frequency of the A to D converter and the velocity at which the credit card moves past the read head. For manual card reading applications, the vast majority presently in use, retail store keepers are virtually assured to swipe the cards at different rates through the card readers. One solution for obtaining samples at the same intervals as the original sample interval is to greatly oversample. This can be done either in software or hardware. In other words, a sampling rate $F_{s2}$ is chosen which is much greater than $F_{s1}$. This creates a new sampling interval delta $x_2$ which produces many more samples, perhaps 100 times more, than were taken in the original fingerprinting process. In other words, instead of 150 samples, 15,000 samples may be taken. This requires that only every Mth sample be utilized in order to provide the same data set. M may be chosen as the ratio of Q/P where P is the number of samples taken between the two triggering pulses at the time of fingerprinting and Q is the number of samples taken at the point of sale using an oversampling frequency $F_{s2}$. Since the distance between the trigger events does not change, and the ratio of $F_{s1}$ to $F_{s2}$ is known, the velocity of the card as it is swiped at the retail store location compared to its velocity at the time of fingerprinting may be readily determined. With this oversampling technique, it may be readily shown mathematically that oversampling by a factor of approximately 100 will result in an effective sampling interval at the point of sale which will be within 2% of the original sampling interval for velocities which are as much as five times greater than the velocity used at the time that the fingerprint was determined. If necessary, an even greater oversampling rate would accommodate even larger velocity ratios.

The work by the inventors in prototyping the present invention indicate that a digital word size as small as three bits for encoding the value of the fingerprint samples may be sufficient to obtain acceptable results using the proposed correlation analysis technique. This small word size suggests that a custom integrated circuit (IC) may be designed to conduct this correlation. It is well known in the art (for example see the literature on sigma-delta conversion) that n-bit words at a rate $r_1$ can be constructed from a one-bit data stream provided that the data rate of the one-bit data stream is significantly higher than the rate $r_1$. See, for example, "An Integrated Binary Correlator Module", Jespers, et al., IEEE Journal, June 1983. In its simplest form, the word length can be increased by one bit for every factor of four in the oversampling rate. Moreover, it is highly likely that in the case of the proposed correlation technique it might not be necessary to construct the n-bit data word. If that is the case, performing the correlations on a one-bit data stream is trivial. For the case of one-bit data, and signals with a zero mean (such as with magnetic medium noise), the correlation coefficient r is given by the following expression $$r = \sum_{i=0}^{N-1} x_i y_i$$

Figure 17:
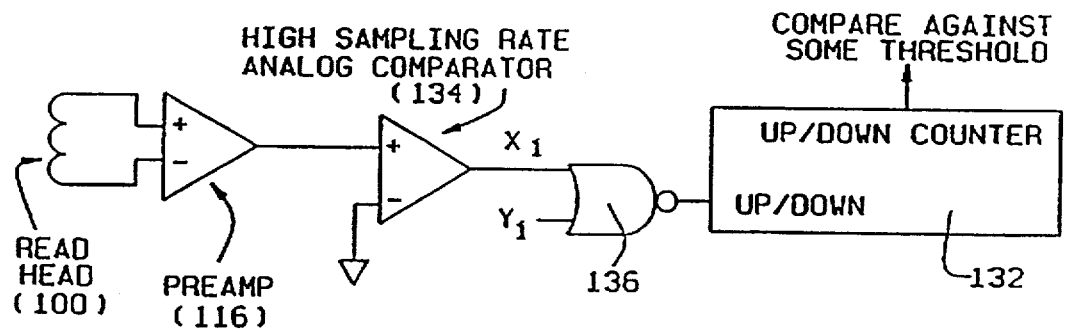
FIG. 17 is a schematic diagram of a correlation circuit utilizing single bit data streams.

Therefore, this correlation analysis can be performed by using a simple up/down counter 132 as shown in FIG. 17. As shown therein, the read head 100 has its output amplified by a preamplifier 116 which feeds a high sampling rate analog comparator 134 for the $x_i$ input into logic gate 136. The original fingerprint data, in a one-bit data stream, is input in synchronism such that the logic gate 136 output goes positive when the bits match and negative when they do not. The output of the up/down counter 132 is compared against some threshold which, if in excess of the threshold indicates a match with the original fingerprint.

Just as it is possible to take a one-bit data stream at a high rate and construct an n-bit word at a lower rate, the inverse is also feasible. In other words, at the time of creation, the magnetic medium to be fingerprinted could be sampled with a four-bit A to D converter, for example. The fingerprint data can then be stored in four-bit words. At the point of authentication, the four-bit data samples could be translated into a one-bit data stream at the higher rate, such as is implemented in recent model CD players. This four-bit data stream is then correlated with the one-bit data stream emanating from the analog comparator 134.

Still another methodology to ensure the capture of data samples corresponding to those used during the original fingerprinting process involves, essentially, measuring the velocity of the credit card and adjusting the sampling rate to match that velocity. More exactly, two transitions or other fiduciary marks may be placed on the card which are a fixed distance D apart. The time it takes for the card "to be pulled from the first transition to the second transition defines the velocity that the card is being pulled through the reader. The sampling rate may then be adjusted to match that velocity which relies on the assumption that the velocity that the card will travel for the second interval will match that of the first interval. As these distances are only a few hundred microns, this assumption is reliable. This technique does not require any oversampling which therefore minimizes the amount of memory required to store the data points collected during the verification or card read step. In implementing this approach, a phase locked loop may be utilized where the input frequency is divided by a factor M and the feedback loop is divided by a factor N such that N over M times $F_{reference}$ equals $F_s$ (sampling frequency). The factors M and N may be chosen depending upon the other parameters of the system, such as the sample size, expected sampling frequency, distance D, etc. As noted, this technique provides the advantage of eliminating oversampling which reduces the required memory. It does suffer from a disadvantage in that a velocity measurement must be made over a very small physical region, several hundred microns, which may present accuracy problems.

As mentioned previously, credit card readers which are motorized, or which otherwise standardize the velocity at which the card is pulled through the reader could be used to minimize this sampling and matching problem. Furthermore, it is possible to combine several of the methodologies to thereby form a hybrid methodology which might provide the best results. For example, the credit card reader might be designed to match the sampling interval which, as explained above, ideally eliminates the requirement for oversampling. However, oversampling may also be used in conjunction with interval matching to ensure that variations may be corrected for.

Figure 6:
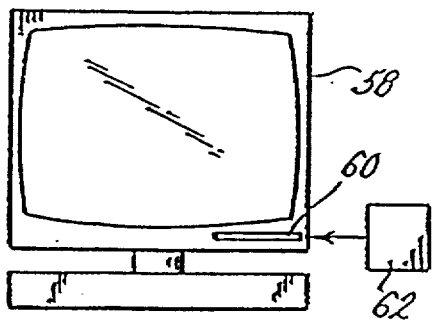
FIG. 6 depicts a personal computer with a computer diskette for insertion in a floppy disk drive thereof.
Figure 7:
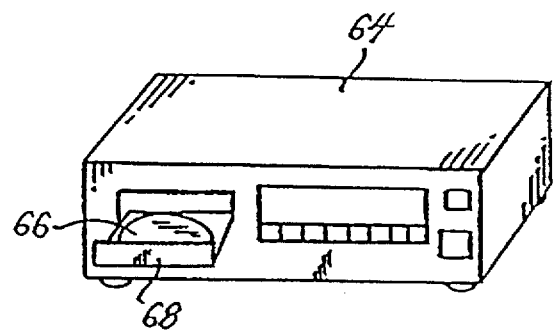
FIG. 7 is a perspective view of a magneto-optic disc player with a magneto-optic disc in its tray.

As shown in FIG. 6, a computer 58 has a floppy disk drive 60 for reading floppy diskettes 62, all as is well known in the art. As still another implementation of the inventors' device, the software recorded on floppy diskette 62 may first require that the floppy disk drive 60 read a designated region of the magnetic medium comprising floppy diskette 62 to determine its fingerprint, compare that fingerprint with the fingerprint stored in the program resident in floppy diskette 62, and if they match permit computer 58 to run the application program stored on floppy diskette 62. If the program stored on floppy diskette 62 is not the original floppy diskette, then the application program will not be run as the measured fingerprint will not match the fingerprint stored in data contained in the floppy diskette 62. In a variation of this implementation, a single, archival, copy of floppy diskette 62 may be permitted should the program resident in floppy diskette 62 allow it to run if the measured fingerprint is either a match with the fingerprint stored, or is its first non-match. The non-match fingerprint would then also be stored in the application software resident in floppy diskette 62 such that the program would recognize the original floppy diskette 62 and a second floppy diskette as used by a user to create this backup, archival, copy.

In still another implementation of the present invention, a magneto-optic disc player 64 has a disc 66 placed in its tray 68 and ready for play upon retraction of tray 68. However, disc 66 may have its fingerprint stored to match the disc medium. Should magneto-optic disc player 64 have the appropriate circuitry for preconditioning play of disc 66 with a comparison of the measured and recorded fingerprints, unauthorized copying of disc 66 may be prevented. Similarly, any taped copies made from disc 66 would necessarily have the incorrect fingerprint stored therein and its subsequent play would also be prohibited should the tape playback unit have an appropriate circuit for preconditioning play based on matching stored and measured fingerprints.

Figure 8:
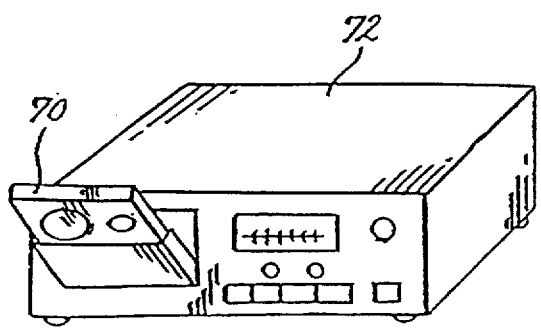
FIG. 8 is a cassette player depicting a cassette tape for play therein.

As shown in FIG. 8, still another implementation of the invention includes measuring and storing the appropriate fingerprint on a cassette or digital tape 70, with a cassette tape player 72 having the necessary circuitry for measuring and comparing the recorded and measured fingerprints to pre-condition play, as explained above.

Figure 9:
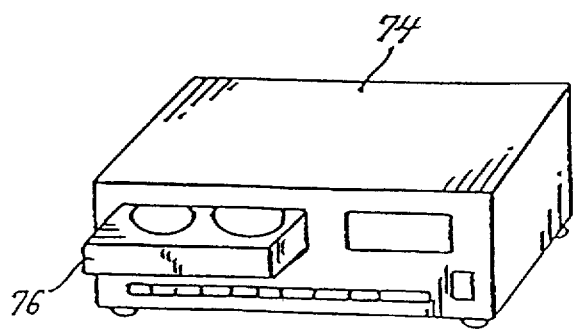
FIG. 9 is a perspective view of a VCR with a tape ready for insertion.

In still another implementation of the present invention, as shown in FIG. 9 a VCR 74 has a VCR tape 76 ready for insertion therein. Using the present invention, a fingerprint can readily be measured and encoded onto the VCR tape for comparison by appropriate circuitry contained within VCR 74. Thus, if appropriately configured, the VCR would not play back a tape unless it was authentic or original.

Figure 25:
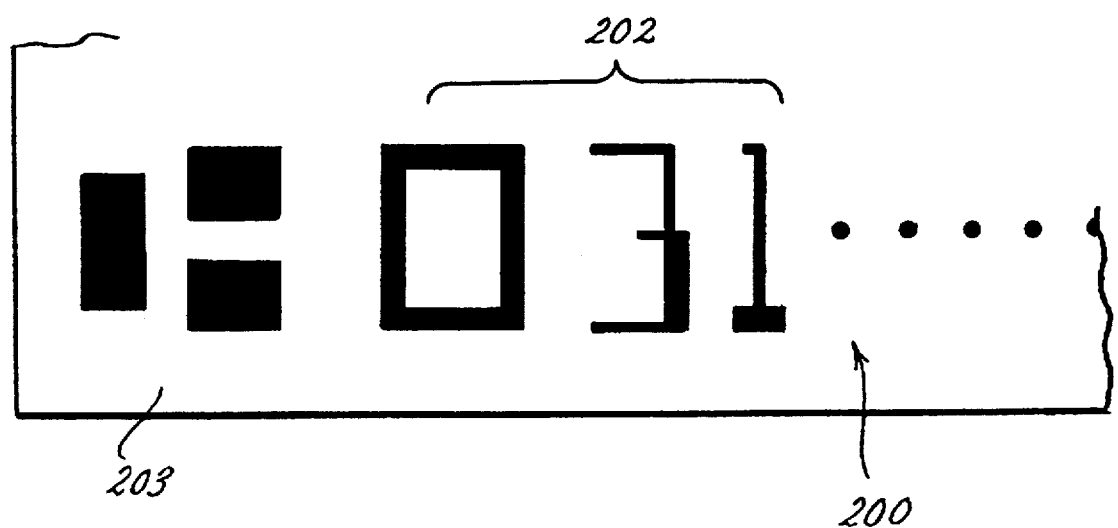

As shown in FIG. 25, still another implementation of the present invention includes its use with a bank check 200 wherein the plurality of magnetic ink numbers 202 along the lower edge of bank check 200 each comprise a "magnetic medium" which may be identified and used as a fingerprint.

For example, the fiducial character 203 contains magnetic ink which should be sufficiently long to achieve the fingerprinting of the present invention. For this purpose, alternately, any one of the standardized characters at any one of its locations could be utilized. Furthermore, in order to accommodate the changing numbers used at the various positions on the bank check 200, an additional digit might even be added solely for accommodating the fingerprinting process. Use of the fiducial character 203 or an additional digit would enable a certain uniformity to be introduced and maintained as the particular data bits vary from bank to bank, checking account to checking account, etc. As explained above, the digital representation of the fingerprint itself may be contained in as few as three ascii or other characters which renders the bank check 200 suitable for adding these extra characters to thereby record the fingerprint value immediately on each of the bank checks 200. With this implementation, each bank check may be readily fingerprinted and carry the value of its fingerprint in a magnetic ink character for immediate, point of processing, authentication at various stages in the check clearing system. Alternately, the fingerprint data may be encrypted or embodied into any of the other data already present on the check 200. The same would be true for other financial instruments including stock certificates, bonds, bond coupons, bearer bonds, money orders, commercial retail establishment gift certificates, etc. These kinds of magnetic media may be generally thought of as non-recording magnetic media in that their principal purpose is other than for the magnetic recording of information thereon. In other words, the decimal numbers applied with magnetic ink to the lower edges of bank checks are applied in an outline which is itself intended to convey information, i.e. a decimal number. It is not intended that other data be recorded onto these magnetic ink numbers. Instead, the magnetic ink numbers themselves are intended to be read as the check is processed. This may be considered as a subset for the phrase "magnetic medium" which would include recording magnetic media which are intended to have additional information magnetically recorded thereon. Examples of recording magnetic media are given above including magneto-optic discs and tapes, cassette tapes, reel-to-reel tapes, videotapes, computer floppy diskettes, credit card and ATM cards, etc. The inventors envision that their invention may be readily used with all kinds of magnetic media, including both recording and non-recording as is explained herein.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A device for fingerprinting an object for the later determination of its identity, said object including at least in part, a non-recording magnetic medium portion, said device having means for determining a remanent noise for said non-recording magnetic medium portion, said remanent noise comprising the fingerprint for said object, and means for recording said remanent noise for later comparison with the later determination of said remanent noise to thereby identify said object.

2. The device of claim 1 wherein said recording means has means for recording said fingerprint on said object.

3. The device of claim 2 wherein said recording means includes means for embodying said remanent noise in said non-recording magnetic medium portion in machine readable form.

4. The device of claim 3 further comprising means for encrypting said remanent noise prior to its being recorded by said recording means.

5. The device of claim 4 wherein said object is a financial instrument.

6. The device of claim 5 wherein said non-recording magnetic medium portion comprises at least a portion of a character applied to said financial instrument.

7. The device of claim 6 wherein said financial instrument is a bank check.

8. The device of claim 7 wherein said remanent noise is encrypted with a trap door function.

9. The device of claim 2 wherein said non-recording magnetic medium portion comprises a label affixed to said object.

10. An object having its fingerprint recorded for the later verification of its identity, said object having a non-recording magnetic medium portion, said finger-print comprising a remanent noise for said non-recording magnetic medium portion.

11. The object of claim 10 wherein said fingerprint is recorded on said object.

12. The object of claim 11 wherein said remanent noise is recorded in said non-recording magnetic medium portion in machine readable form.

13. The object of claim 12 wherein said remanent noise is encrypted prior to its being recorded on said object.

14. The object of claim 13 wherein said object is a financial instrument.

15. The object of claim 14 wherein said non-recording magnetic medium portion comprises at least a portion of a character applied to said financial instrument.

16. The object of claim 15 wherein said financial instrument is a bank check.

17. The object of claim 10 wherein said magnetic medium portion comprises a label affixed to said object.

18. The device of claim 1 wherein said determining means includes means for DC saturating a region of said non-recording magnetic medium and means for reading a residual voltage over said region, said residual voltage comprising said remanent noise.

19. The device of claim 18 wherein said region comprises a linear portion extending between about 30 micrometers and about 4300 micrometers.

20. The device of claim 18 wherein said determining means further comprises means for averaging a plurality of residual voltage readings, said average comprising said fingerprint.

21. The device of claim 1 wherein said determining means comprises a conventional magnetic recording head.

22. A device for authenticating an object having a fingerprint recorded, said object having a non-recording magnetic medium portion, said fingerprint comprising a remanent noise for said non-recording magnetic medium portion, said device including means for reading said recorded fingerprint, means for translating said remanent noise from said recorded fingerprint, means for determining a remanent noise directly from said non-recording magnetic medium portion, and means for comparing said translated remanent noise with said determined remanent noise to determine whether they match, thereby authenticating said object.

23. The device of claim 22 wherein said object has its fingerprint recorded thereon.

24. The device of claim 22 wherein said fingerprint is embodied in said non-recording magnetic medium portion in machine readable form.

25. The device of claim 24 wherein said fingerprint is encrypted, and said translation means includes means for de-crypting said fingerprint.

26. The device of claim 25 wherein said object is a financial instrument.

27. The device of claim 26 wherein said non-recording magnetic medium portion comprises at least a portion of a character applied to said financial instrument.

28. The device of claim 27 wherein said financial instrument is a bank check.

29. The device of claim 25 wherein said remanent noise is encrypted with a trap door function.

30. The device of claim 22 wherein said non-recording magnetic medium portion comprises a label affixed to said object.

31. A method for authenticating an object, said object including at least in part a non-recording magnetic medium portion, said object having a fingerprint recorded, said fingerprint comprising a previously determined remanent noise for said non-recording magnetic medium portion, said method comprising the steps of:

determining a remanent noise directly from said non-recording magnetic medium portion, reading said fingerprint, and comparing said determined remanent noise with said fingerprint.

32. The method of claim 31 wherein said fingerprint comprises a machine readable representation of said previously determined remanent noise, and the step of reading includes the step of reading said fingerprint with a machine.

33. The method of claim 32 wherein said fingerprint comprises an encrypted representation of said previously determined remanent noise, and further comprising the step of de-crypting said fingerprint.

34. A method for fingerprinting an object for the later determination of its identity, said object including at least in part a non-recording magnetic medium portion, said method comprising the steps of determining a remanent noise for said non-recording magnetic medium portion, said remanent noise comprising said fingerprint, and recording said fingerprint on said object for the later comparison thereof with the later determination of said remanent noise.

35. The method of claim 34 further comprising the step of encrypting said fingerprint prior to recording.

36. A device for fingerprinting an object for the later determination of its identity, said object including at least in part, a non-recording magnetic medium portion, said device having means for determining a remanent noise for a length of no more than about several hundreds of micrometers of said non-recording magnetic medium portion, said remanent noise comprising the fingerprint for said object, and means for recording said remanent noise for later comparison with the later determination of said remanent noise to thereby identify said object.

37. The device of claim 36 wherein said recording means has means for recording said fingerprint on said object.

38. The device of claim 37 Wherein said recording means includes means for embodying said remanent noise in said non-recording magnetic medium portion in machine readable form.

39. The device of claim 38 further comprising means for encrypting said remanent noise prior to its being recorded by said recording means.

40. The device of claim 39 wherein said object is a financial instrument.

41. The device of claim 40 wherein said non-recording magnetic medium portion comprises at least a portion of a character applied to said financial instrument.

42. A device for fingerprinting an object for the later determination of its identity, said object including at least in part, a non-recording magnetic medium portion, said device having means for determining a remanent noise from a magnetic micro-structure for said nonrecording magnetic medium portion, said remanent noise comprising the fingerprint for said object, and means for recording said remanent noise for later comparison with the later determination of said remanent noise to thereby identify said object.

43. The device of claim 42 wherein said recording means has means for recording said fingerprint on said object.

44. The device of claim 43 wherein said recording means includes means for embodying said remanent noise in said non-recording magnetic medium portion in machine readable form.

45. The device of claim 44 further comprising means for encrypting said remanent noise prior to its being recorded by said recording means.

46. The device of claim 42 wherein said object is a financial instrument.

47. The device of claim 46 wherein said non-recording magnetic medium portion comprises at least a portion of a character applied to said financial instrument.

48. A device for fingerprinting an object for the later determination of its identity, said object including at least in part, a uniformly manufactured non-recording magnetic medium portion, said device having means for determining a remanent noise for said non-recording magnetic medium portion, said remanent noise comprising the fingerprint for said object, and means for recording said remanent noise for later comparison with the later determination of said remanent noise to thereby identify said object.

49. The device of claim 48 wherein said recording means has means for recording said fingerprint on said object.

50. The device of claim 49 wherein said recording means includes means for embodying said remanent noise in said non-recording magnetic medium portion in machine readable form.

51. The device of claim 48 wherein said object is a financial instrument.

52. The device of claim 51 wherein said non-recording magnetic medium portion comprises at least a portion of a character applied to said financial instrument.

53. An object having its fingerprint recorded for the later verification of its identity, said object having a non-recording magnetic medium portion, said fingerprint comprising a remanent noise for no more than about several hundreds of micrometers of said non-recording magnetic medium portion.

54. The object of claim 53 wherein said fingerprint is recorded on said object.

55. The object of claim 54 wherein said remanent noise is embodied in said non-recording magnetic medium portion in machine readable form.

56. The object of claim 55 wherein said remanent noise is encrypted prior to its being recorded on said object.

57. The device of claim 53 wherein said object is a financial instrument.

58. The device of claim 57 wherein said non-recording magnetic medium portion comprises at least a portion of a character applied to said financial instrument.

59. An object having its fingerprint recorded for the later verification of its identity, said object having a non-recording magnetic medium portion, said fingerprint comprising a remanent noise from a magnetic microstructure for said non-recording magnetic medium portion.

60. The object of claim 59 wherein said fingerprint is recorded on said object.

61. The object of claim 60 wherein said remanent noise is embodied in said non-recording magnetic medium portion in machine readable form.

62. The object of claim 61 wherein said remanent noise is encrypted prior to its being recorded on said object.

63. The device of claim 59 wherein said object is a financial instrument.

64. The device of claim 63 wherein said non-recording magnetic medium portion comprises at least a portion of a character applied to said financial instrument.

65. An object having its fingerprint recorded for the later verification of its identity, said object having a uniformly manufactured non-recording magnetic medium portion, said fingerprint comprising a remanent noise for said non-recording magnetic medium portion.

66. The object of claim 65 wherein said fingerprint is recorded on said object.

67. The object of claim 66 wherein said remanent noise is embodied in said non-recording magnetic medium portion in machine readable form.

68. The object of claim 67 wherein said remanent noise is encrypted prior to its being recorded on said object.

69. The device of claim 65 wherein said object is a financial instrument.

70. The device of claim 69 wherein said non-recording magnetic medium portion comprises at least a portion of a character applied to said financial instrument.

71. A device for authenticating an object having a fingerprint recorded, said object having a non-recording magnetic medium portion, said fingerprint comprising a remanent noise for a length of no more than about several hundreds of micrometers of said non-recording magnetic medium portion, said device including means for reading said recorded fingerprint, means for translating said remanent noise from said fingerprint, means for determining a remanent noise directly from said non-recording magnetic medium portion, and means for comparing said translated remanent noise with said determined remanent noise to determine whether they match, thereby authenticating said object.

72. The device of claim 71 wherein said object has its fingerprint recorded thereon.

73. The device of claim 72 wherein said fingerprint is embodied in said non-recording magnetic medium portion in machine readable form.

74. The device of claim 73 wherein said fingerprint is encrypted, and said translation means includes means for de-crypting said fingerprint.

75. The device of claim 71 wherein said object is a financial instrument.

76. The device of claim 75 wherein said non-recording magnetic medium portion comprises at least a portion of a character applied to said financial instrument.

77. A device for authenticating an object having a fingerprint recorded, said object having a non-recording magnetic medium portion, said fingerprint comprising a remanent noise from a magnetic micro-structure for said non-recording magnetic medium portion, said device including means for reading said recorded fingerprint, means for translating said remanent noise from said fingerprint, means for determining a remanent noise directly from said non-recording magnetic medium portion, and means for comparing said translated remanent noise with said determined remanent noise to determine whether they match, thereby authenticating said object.

78. The device of claim 77 wherein said object has its fingerprint recorded thereon.

79. The device of claim 77 wherein said fingerprint is embodied in said non-recording magnetic medium portion in machine readable form.

80. The device of claim 79 wherein said fingerprint is encrypted, and said translation means includes means for de-crypting said fingerprint.

81. The device of claim 77 wherein said object is a financial instrument.

82. The device of claim 81 wherein said non-recording magnetic medium portion comprises at least a portion of a character applied to said financial instrument.

83. A device for authenticating an object having a fingerprint recorded, said object having a uniformly manufactured non-recording magnetic medium portion, said fingerprint comprising a remanent noise for said nonrecording magnetic medium portion, said device including means for reading said recorded fingerprint, means for translating said remanent noise from said fingerprint, means for determining a remanent noise directly from said non-recording magnetic medium portion, and means for comparing said translated remanent noise with said determined remanent noise to determine whether they match, thereby authenticating said object.

84. The device of claim 83 wherein said object has its fingerprint recorded thereon.

85. The device of claim 83 wherein said fingerprint is embodied in said non-recording magnetic medium portion in machine readable form.

86. The device of claim 85 wherein said fingerprint is encrypted, and said translation means includes means for de-crypting said fingerprint.

87. The device of claim 83 wherein said object is a financial instrument.

88. The device of claim 87 wherein said non-recording magnetic medium portion comprises at least a portion of a character applied to said financial instrument.

89. A method for authenticating an object, said object including at least in part a non-recording magnetic medium portion, said object having a fingerprint recorded, said fingerprint comprising a previously determined remanent noise for a length of no more than about several hundreds of micrometers of said non-recording magnetic medium portion, said method comprising the steps of:

determining a remanent noise directly from said non-recording medium portion, reading said fingerprint, and correlating said determined remanent noise with said fingerprint, said correlation thereby indicating if said object is authentic.

90. The method of claim 89 wherein said fingerprint comprises a machine readable representation of said previously determined remanent noise, and the step of reading includes the step of reading said fingerprint with a machine.

91. The method of claim 90 wherein said fingerprint comprises an encrypted representation of said previously determined remanent noise, and further comprising the step of de-crypting said fingerprint.

92. A method for authenticating an object, said object including at least in part a non-recording magnetic medium portion, said object having a fingerprint recorded, said fingerprint comprising a previously determined remanent noise from a magnetic micro-structure for said non-recording magnetic medium portion, said method comprising the steps of:

determining a remanent noise directly from said non-recording medium portion, reading said fingerprint, and correlating said determined remanent noise with said fingerprint, said correlation thereby indicating if said object is authentic.

93. The method of claim 92 wherein said fingerprint comprises a machine readable representation of said previously determined remanent noise, and the step of reading includes the step of reading said fingerprint with a machine.

94. The method of claim 93 wherein said fingerprint comprises an encrypted representation of said previously determined remanent noise, and further comprising the step of de-crypting said fingerprint.

95. A method for authenticating an object, said object including at least in part a uniformly manufactured non-recording magnetic medium portion, said object having a fingerprint recorded, said fingerprint comprising a previously determined remanent noise for said nonrecording magnetic medium portion, said method comprising the steps of:

determining a remanent noise directly from said non-recording magnetic medium portion, reading said fingerprint, and correlating said determined remanent noise with said fingerprint, said correlation thereby indicating if said object is authentic.

96. The method of claim 95 wherein said fingerprint comprises a machine readable representation of said previously determined remanent noise, and the step of reading includes the step of reading said fingerprint with a machine.

97. The method of claim 96 wherein said fingerprint comprises an encrypted representation of said previously determined remanent noise, and further comprising the step of de-crypting said fingerprint.

98. A method for fingerprinting an object for the later determination of its identity, said object including at least in part a non-recording magnetic medium portion, said method comprising the steps of determining a remanent noise for a length of no more than about several hundreds of micrometers of said non-recording magnetic medium portion, said remanent noise comprising said fingerprint, and recording said fingerprint on said object for the later comparison thereof with the later determination of said remanent noise.

99. The method of claim 98 further comprising the step of encrypting said fingerprint prior to recording.

100. A method for fingerprinting an object for the later determination of its identity, said object including at least in part a non-recording magnetic medium portion, said method comprising the steps of determining a remanent noise from a magnetic micro-structure for said non-recording magnetic medium portion, said remanent noise comprising said fingerprint, and recording said fingerprint on said object for the later comparison thereof with the later determination of said remanent noise.

101. The method of claim 100 further comprising the step of encrypting said fingerprint prior to recording.

102. A method for fingerprinting an object for the later determination of its identity, said object including at least in part a uniformly manufactured non-recording magnetic medium portion, said method comprising the steps of determining a remanent noise for said non-recording magnetic medium portion, said remanent noise comprising said fingerprint, and recording said fingerprint on said object for the later comparison thereof with the later determination of said remanent noise.

103. The method of claim 102 further comprising the step of encrypting said fingerprint prior to recording.

104. A device for authenticating an object having a fingerprint recorded, said object having a non-recording magnetic medium portion, said recorded fingerprint comprising a signal corresponding to a first read of a remanent noise in said non-recording magnetic medium portion, means for determining said fingerprint by a second read of said remanent noise in said non-recording magnetic medium portion, and means for comparing said recorded fingerprint with said determined fingerprint including means for compensating for differences between said first read and said second read to determine whether said fingerprints match, thereby authenticating said object.

105. The device of claim 104 wherein said compensating means includes means for compensating for differences between a speed at which each of said first read and said second read is performed.

106. The device of claim 105 wherein said speed compensation means includes means for adjusting a sampling rate at which said second read is performed.

107. The device of claim 106 wherein said adjusting means includes means for measuring the speed of said second read and comparing it with the speed of said first read.

108. The device of claim 105 wherein said speed compensation means includes means for oversampling said remanent noise during at least said second read.

109. The device of claim 108 wherein said speed compensation means includes means for adjusting a rate of said oversampling.

110. The device of claim 105 wherein each of said recorded and determined fingerprints comprises a digital sample of said remanent noise, and wherein said speed compensation means includes means for creating for said second read a digital sample approximately 100 times larger than the digital sample of said first read.

111. A method for authenticating an object, said object including at least in part a non-recording magnetic medium portion having a fingerprint, said fingerprint comprising a remanent noise for said non-recording magnetic medium portion previously determined by a first read thereof, said method comprising the steps of:

determining a remanent noise directly from said magnetic medium portion by a second read thereof, comparing said determined remanent noise with said previously determined remanent noise, and compensating for differences between said first read and said second read to determine whether said fingerprints match, thereby authenticating said object.

112. The method of claim 111 wherein the step of compensating further includes the step of compensating for differences between a speed at which each of said first read and said second read is performed.

113. The method of claim 112 wherein the step of speed compensating further includes the step of adjusting a sampling rate at which said second read is performed.

114. The method of claim 113 wherein the step of adjusting includes the steps of measuring the speed of said second read and comparing it with the speed of said first read.

115. The method of claim 112 wherein the step of speed compensating further includes the step of oversampling said remanent noise during at least said second read.

116. The method of claim 115 wherein the step of speed compensating further includes the step of adjusting a rate of oversampling.

117. The method of claim 112 wherein each of said previously determined remanent noise and said determined remanent noise comprises a digital sample of said remanent noise, and wherein the step of speed compensating further comprises the step of creating for said second read a digital sample approximately 100 times larger than the digital sample of said first read.

118. An object having its fingerprint recorded for the later verification of its identity, said object having a non-recording magnetic medium portion, said fingerprint comprising a remanent noise for said non-recording magnetic medium portion determined by a first read of said non-recording magnetic medium portion, and a speed of said read being recorded in association with said fingerprint for later use in compensating for differences between a speed of a subsequent read and the speed of said first read.

119. The object of claim 118 further comprising a plurality of spaced timing marks on said non-recording magnetic medium portion so that a speed of said non-recording magnetic medium portion may be determined during a read.

120. A security card with a fingerprint for limiting access to a controlled access environment, said security card having a non-recording magnetic medium portion, said fingerprint comprising a remanent noise for said nonrecording magnetic medium portion, said security card being validated to permit access only upon a match of a subsequent determination of said fingerprint with a previously determined fingerprint.

* * * * *

UNITED STATES PATENT AND TRADEMARK OFFICE
CERTIFICATE OF CORRECTION

PATENT NO. : 5,546,462
DATED : August 13, 1996
INVENTOR(S) : Indeck, et al.

Figure 18:
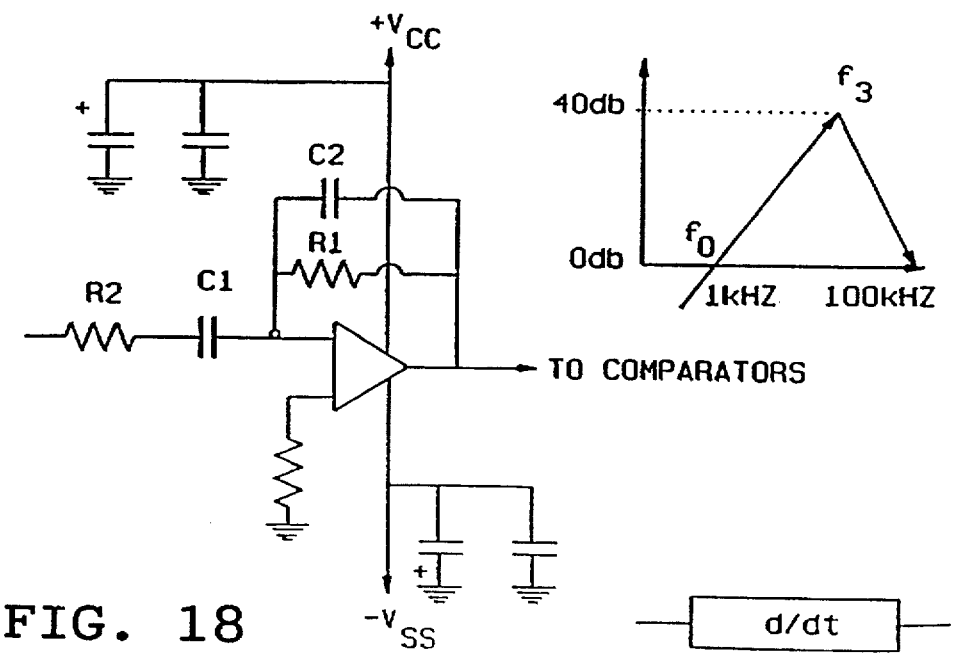
Figure 19:
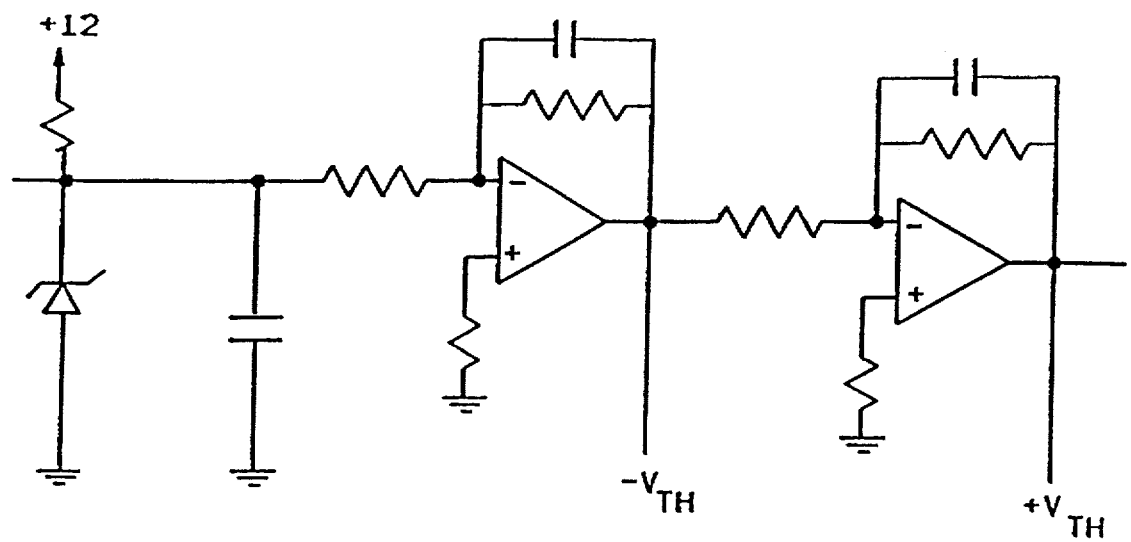
Figure 20:
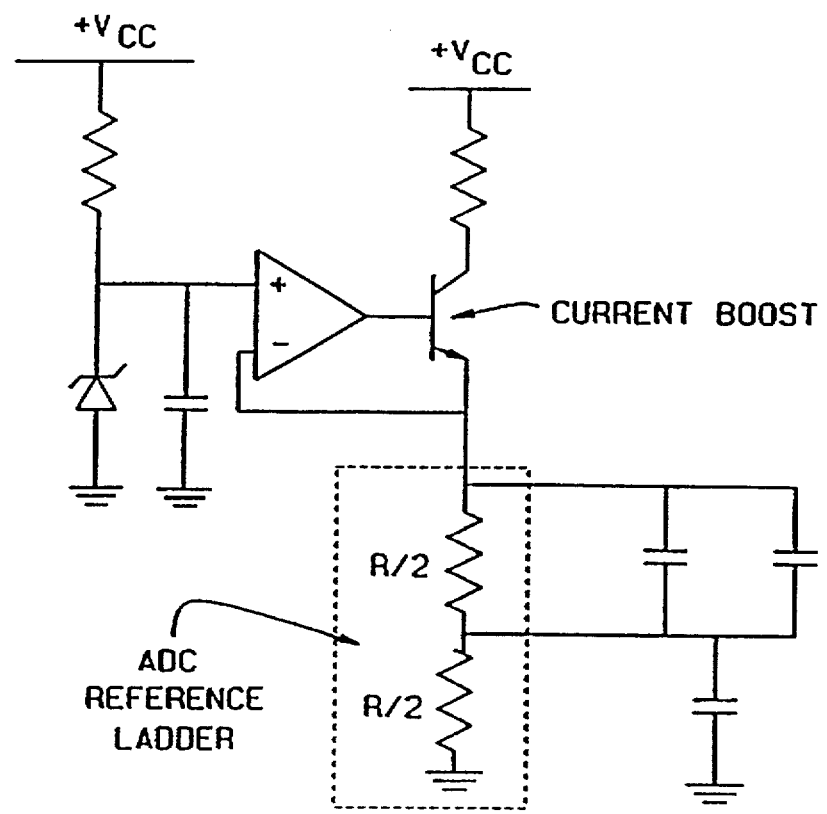
Figure 21:
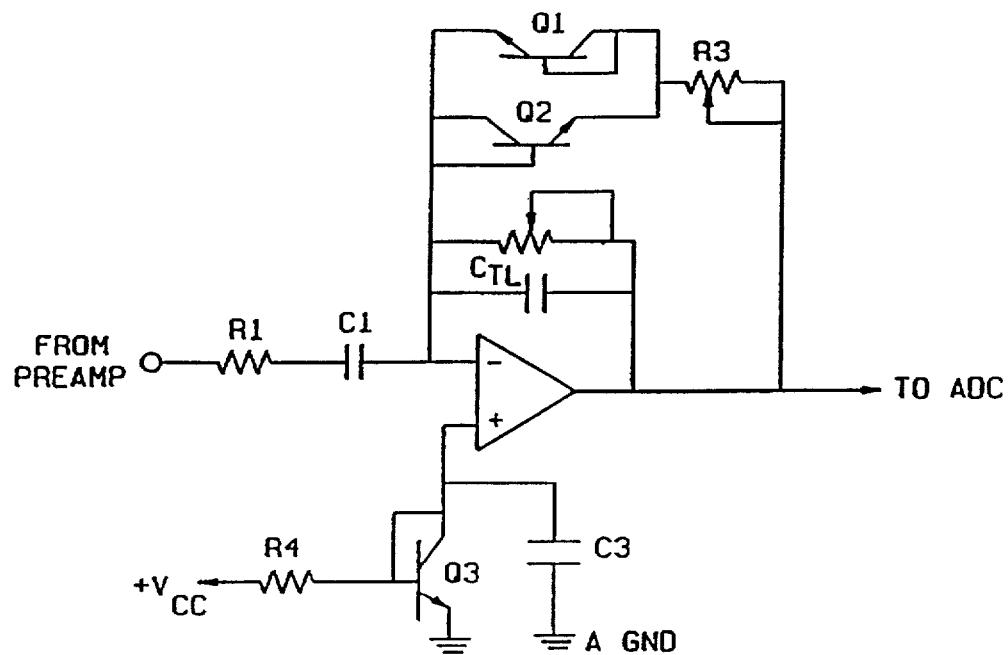

It is certified that error appears in the above-indentified patent and that said Letters Patent is hereby corrected as shown below:

In column 9, after line 18, please insert the following:

--Figure 18 is a schematic diagram of an active differentiator;
Figure 19 is a schematic diagram of the threshold generator;
Figure 20 is a schematic diagram of the ADC reference generator;
Figure 21 is a schematic diagram of a gain circuit;
Figure 22 is a plot from a read of a magnetic credit card stripe;
Figure 23 is an enlarged view of the encircled portion of the waveform in Figure 22;
Figure 24 is a waveform giving the correlation of two fingerprints; and
Figure 25 is an enlarged view of a portion of a financial instrument, such as a bank check, detailing the use of the magnetic ink numbering in the present invention.--.

UNITED STATES PATENT AND TRADEMARK OFFICE
CERTIFICATE OF CORRECTION

PATENT NO. : 5,546,462
DATED : August 13, 1996
INVENTOR(S) : Indeck, et al.

It is certified that error appears in the above-indentified patent and that said Letters Patent is hereby corrected as shown below:

In column 9, line 48, substitute --just-- for "Just".

In column 13, line 45, delete the quotation mark before the word "to".

Signed and Sealed this

Third Day of December, 1996

Attest:

BRUCE LEHMAN

Attesting Officer

Commissioner of Patents and Trademarks